US012593231B2

(12) United States Patent　　(10) Patent No.:　US 12,593,231 B2
　　Eklöf et al.　　　　　　　　　　(45) Date of Patent:　　Mar. 31, 2026

(54) ALIGNING RADIO RELATED MEASUREMENTS WITH QoE (QUALITY OF EXPERIENCE) MEASUREMENTS

(71) Applicant: Telefonaktiebolaget LM Ericsson (publ), Stockholm (SE)

(72) Inventors: Cecilia Eklöf, Täby (SE); Ali Parichehrehteroujeni, Linköping (SE); Robert Petersen, Linköping (SE); Luca Lunardi, Genoa (IT); Filip Barac, Huddinge (SE); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 400 days.

(21) Appl. No.: 18/031,381

(22) PCT Filed: Sep. 24, 2021

(86) PCT No.: PCT/SE2021/050929
§ 371 (c)(1),
(2) Date: Apr. 12, 2023

(87) PCT Pub. No.: WO2022/086385
PCT Pub. Date: Apr. 28, 2022

(65) Prior Publication Data
US 2023/0388829 A1　　Nov. 30, 2023

Related U.S. Application Data

(60) Provisional application No. 63/104,170, filed on Oct. 22, 2020.

(51) Int. Cl.
*H04W 24/10*　　(2009.01)
*H04L 43/062*　　(2022.01)
(Continued)

(52) U.S. Cl.
CPC ........... *H04W 24/10* (2013.01); *H04L 43/062* (2013.01); *H04L 43/08* (2013.01); *H04W 24/02* (2013.01); *H04W 24/08* (2013.01)

(58) Field of Classification Search
CPC ................. H04W 24/00–10; H04L 43/06–062
See application file for complete search history.

(56) References Cited

U.S. PATENT DOCUMENTS 11,509,546 B2 * 11/2022 Eklöf .................. H04L 41/5067
12,439,286 B2 * 10/2025 Kumar .................. H04W 24/08
(Continued)

FOREIGN PATENT DOCUMENTS

WO　　2019073340 A1　　4/2019
WO　　2019106055 A1　　6/2019
(Continued)

OTHER PUBLICATIONS

"3GPP TS 25.133 V16.0.0", 3rd Generation Partnership Project; Technical Specification Group Radio Access Network; Requirements for support of radio resource management (FDD) (Release 16), Dec. 2018, pp. 1-411.
(Continued)

*Primary Examiner* — Brendan Y Higa
(74) *Attorney, Agent, or Firm* — Murphy, Bilak & Homiller, PLLC

(57) ABSTRACT

Embodiments described herein relate to methods and apparatuses for performing radio measurements. A method performed by a wireless device comprises responsive to an application session starting, performing one or more Quality of Experience. QoE, measurements associated with the application; transmitting a first session feedback indication based on the QoE measurements to a base station, wherein the first session feedback indication indicates that the application session has started; and responsive to transmitting the
(Continued)

first session feedback indication, receiving a command from the base station to perform one or more radio measurements.

22 Claims, 27 Drawing Sheets

(51) Int. Cl.
  *H04W 24/02* (2009.01)
  *H04W 24/08* (2009.01)
  *H04L 43/08* (2022.01)

(56) References Cited

U.S. PATENT DOCUMENTS

| | | | | |
|---|---|---|---|---|
| 2013/0114446 A1* | 5/2013 | Liu | | H04W 24/10 |
| | | | | 370/252 |
| 2013/0128756 A1* | 5/2013 | Zhang | | H04W 4/06 |
| | | | | 370/252 |
| 2013/0268577 A1 | 10/2013 | Oyman | | |
| 2013/0286868 A1 | 10/2013 | Oyman et al. | | |
| 2017/0134980 A1 | 5/2017 | Persson et al. | | |
| 2018/0035438 A1 | 2/2018 | Pao et al. | | |
| 2018/0041913 A1* | 2/2018 | Zhu | | H04L 65/65 |
| 2018/0324617 A1* | 11/2018 | Schmidt | | H04W 24/08 |
| 2019/0222491 A1 | 7/2019 | Tomkins et al. | | |
| 2020/0112907 A1 | 4/2020 | Dao et al. | | |
| 2020/0145851 A1 | 5/2020 | Berlin et al. | | |
| 2020/0280498 A1* | 9/2020 | Eklöf | | H04L 65/80 |
| 2021/0352749 A1 | 11/2021 | Szilagyi et al. | | |
| 2021/0409998 A1 | 12/2021 | Kwok et al. | | |
| 2022/0070709 A1* | 3/2022 | Kumar | | H04W 24/08 |
| 2022/0158781 A1 | 5/2022 | Zhu et al. | | |
| 2022/0279385 A1* | 9/2022 | Johansson | | H04W 24/04 |
| 2022/0417780 A1 | 12/2022 | Liu et al. | | |
| 2023/0115085 A1 | 4/2023 | Hu et al. | | |
| 2023/0116324 A1* | 4/2023 | Eklöf | | H04W 24/10 |
| | | | | 370/331 |

FOREIGN PATENT DOCUMENTS

| | | | |
|---|---|---|---|
| WO | 2022005359 A1 | 1/2022 | |
| WO | 2022075904 A1 | 4/2022 | |

OTHER PUBLICATIONS

"3GPP TS 25.331 V16.1.0", 3rd Generation Partnership Project; Technical Specification Group Radio Access Network; Radio Resource Control (RRC); Protocol specification (Release 16), Sep. 2020, pp. 1-2382.

"3GPP TS 26.114 V16.5.2", 3rd Generation Partnership Project; Technical Specification Group Services and System Aspects; IP Multimedia Subsystem (IMS); Multimedia Telephony; Media handling and interaction (Release 16), Mar. 2020, pp. 1-446.

"3GPP TS 26.247 V16.2.0", 3rd Generation Partnership Project; Technical Specification Group Services and System Aspects; Transparent end-to-end Packet-switched Streaming Service (PSS); Progressive Download and Dynamic Adaptive Streaming over http (3GP-DASH) (Release 16), Dec. 2019, pp. 1-139.

"3GPP TS 27.007 V16.4.0", 3rd Generation Partnership Project; Technical Specification Group Core Network and Terminals; AT command set for User Equipment (UE) (Release 16), Mar. 2020, pp. 1-355.

"3GPP TS 28.307 V16.0.0", 3rd Generation Partnership Project; Technical Specification Group Radio Access Network; Radio Resource Control (RRC); Protocol specification (Release 16), Jul. 2020, pp. 1-10.

"3GPP TS 28.308 V16.0.0", 3rd Generation Partnership Project; Technical Specification Group Services and System Aspects; Telecommunication management; Quality of Experience (QoE) measurement collection Integration Reference Point (IRP); Information Service (IS) (Release 16), Jul. 2020, pp. 1-21.

"3GPP TS 28.309 V16.0.0", 3rd Generation Partnership Project; Tech Spec Grp Services and System Aspects; Telecommunication management; Mgmt of Quality of Experience (QoE) measurement collection Integration Reference Point (IRP); Solution Set (SS) definitions (Release 16), Sep. 2020, pp. 1-31.

"3GPP TS 28.405 V1.3.0", S5-202345; 3rd Generation Partnership Project; Technical Specification Group Services and System Aspects; Telecommunication management; Quality of Experience (QoE) measurement collection; Control and configuration (Release 16), Apr. 2020, pp. 1-53.

"3GPP TS 28.405 V16.0.0", 3rd Generation Partnership Project; Technical Specification Group Services and System Aspects; Telecommunication management; Quality of Experience (QoE) measurement collection; Control and configuration (Release 16), Jul. 2020, pp. 1-16.

"3GPP TS 28.621 V16.0.0", 3rd Generation Partnership Project; Technical Specification Group Services and System Aspects; Telecommunication management; Generic Network Resource Model (NRM) Integration Reference Point (RP); Requirements (Release 16), Jul. 2020, pp. 1-7.

"3GPP TS 28.622 V16.5.0", 3rd Generation Partnership Project; Technical Specification Group Services and System Aspects; Telecommunication management; Generic Network Resource Model (NRM) Integration Reference Point (IRP); Information Service (IS) (Release 16), Sep. 2020, pp. 1-55.

"3GPP TS 28.623 V16.4.0", 3rd Generation Partnership Project; Technical Specification Group Services and System Aspects; Telecommunication management; Generic Network Resource Model (NRM) Integration Reference Point (IRP); Solution Set (SS) definitions (Release 16), Jul. 2020, pp. 1-90.

"3GPP TS 32.422 V16.1.0", 3rd Generation Partnership Project; Technical Specification Group Services and System Aspects; Telecommunication management; Subscriber and equipment trace; Trace control and configuration management (Release 16), Mar. 2020, pp. 1-214.

"3GPP TS 32.441 V16.0.0", 3rd Generation Partnership Project; Technical Specification Group Services and System Aspects; Telecommunication management; Trace Management Integration Reference Point (IRP); Requirements (Release 16), Jul. 2020, pp. 1-15.

"3GPP TS 32.442 V16.0.0", 3rd Generation Partnership Project; Technical Specification Group Services and System Aspects; Telecommunication management; Trace Management Integration Reference Point (IRP); Information Service (IS) (Release 16), Jul. 2020, pp. 1-32.

"3GPP TS 32.446 V16.0.0", 3rd Generation Partnership Project; Technical Specification Group Services and System Aspects; Telecommunication management; Trace Management Integration Reference Point (IRP); Solution Set (SS) definitions (Release 16), Jul. 2020, pp. 1-47.

"3GPP TS 33.210 V16.3.0", 3rd Generation Partnership Project; Technical Specification Group Services and System Aspects; 3G security; Network Domain Security (NDS); IP network layer security (Release 16), Mar. 2020, pp. 1-27.

"3GPP TS 33.210 V16.4.0", 3rd Generation Partnership Project; Technical Specification Group Services and System Aspects; Network Domain Security (NDS); IP network layer security (Release 16), Jul. 2020, pp. 1-27.

"3GPP TS 36.300 V16.0.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), Dec. 2019, pp. 1-366.

"3GPP TS 36.331 V15.9.0", 3rd Generation Partnership Project; Technical Specification Group Radio Access Network; Evolved Universal Terrestrial Radio Access (E-UTRA); Radio Resource Control (RRC); Protocol specification (Release 15), Mar. 2020, 1-964.

"3GPP TS 36.413 V16.1.0", 3rd Generation Partnership Project; Technical Specification Group Radio Access Network; Evolved Universal Terrestrial Radio Access Network (E-UTRAN); S1 Application Protocol (S1AP) (Release 16), Mar. 2020, pp. 1-130.

(56)         References Cited

OTHER PUBLICATIONS

"3GPP TS 38.314 V16.1.0", 3rd Generation Partnership Project; Technical Specification Group Radio Access Network; NR; Layer 2 Measurements; (Release 16), Sep. 2020, pp. 1-18.
"3GPP TS 38.463 V15.4.0", 3rd Generation Partnership Project; Technical Specification Group Radio Access Network; NG-RAN; E1 Application Protocol (E1AP) (Release 15), Jul. 2019, pp. 1-177.
"Agreements for MR-DC with 5GC", 3GPP TSG-RAN WG2 Meeting #104, R2-1819036, Spokane, USA, Nov. 12-16, 2018, pp. 1-53.
"Alignment of radio related measurement and QoE measurement", 3GPP TSG-RAN WG3 #112-e, R3-212496, Online, May 17-28. 2021, pp. 1-3.
"Discussion on QoE measurement collection for RDC", 3GPP TSG-RAN WG2 Meeting #105, R2-1901857, Athens, Greece, Feb. 25-Mar. 1, 2019, pp. 1-3.
"Discussion QoE Measurement Collection for streaming services", 3GPP TSG-RAN WG2 #96, R2-168022, Reno, Nevada, USA, Nov. 14-18, 2016, pp. 1-22.
"LS Reply on QoE Measurement Collection", 3GPP TSG-SA4 Meeting #109-e, S4-200962, Online, May 20-Jun. 3, 2019, pp. 1-2.
"New WI proposal: Quality of Experience (QoE) Measurement Collection for streaming services in E-UTRAN", 3GPP TSG RAN meeting #81, Gold Coast, Australia, RP-181640, Revision of RP-170956, Sep. 10-13, 2018, pp. 1-5.
"NR QoE Measurement Triggering, Configuration, Collection and Reporting", 3GPP TSG-RAN WG2 Meeting #109-e, R2-2007600, Electronic meeting, Aug. 17-28, 2020, pp. 1-5.
"Potential RAN3 impacts about QoE measurement", 3GPP TSG-RAN WG3 #109-e, R3-205283, E-Meeting, Aug. 17-28, 2020, pp. 1-6.
"QoE measurement collection additions", 3GPP TSG RAN2 Meeting #110, R2-2004624, Electronic meeting, Jun. 1-12, 2020, pp. 1-80.
"Stage 2 TP to update bearer type description", 3GPP TSG-RAN WG2 Meeting#100, R2-1714183, Reno, USA, Nov. 27-Dec. 1, 2017, pp. 1-30.
"Summary of NR QoE Services", 3GPP TSG-RAN WG3 #109-e, RS-205479, Online, Aug. 17-28, 2020, pp. 1-8.
"Summary of Offline Discussion on NR QoE Management Solutions", 3GPP TSG-RAN WG3 Meeting #109-e, R3-205726, Online, Aug. 17-27, 2020, pp. 1-13.
"UE Application Layer Measurement ID and Type for QoE for Streaming service in EUTRAN", 3GPP TSG-RAN3 Meeting #98, R3-174807, Reno, USA, Nov. 27-Dec. 1, 2017, pp. 1-22.
"3GPP TS 38.215 V16.4.0", 3rd Generation Partnership Project; Technical Specification Group Radio Access Network; NR; Physical layer measurements (Release 16), Dec. 2020, pp. 1-25.
"3GPP TS 38.300 V16.3.0", 3rd Generation Partnership Project; Technical Specification Group Radio Access Network; NR; NR and NG-RAN Overall Description; Stage 2 (Release 16), Sep. 2020, pp. 1-148.
"3GPP TS 37.340 V16.1.0", 3rd Generation Partnership Project; Technical Specification Group Radio Access Network; Evolved Universal Terrestrial Radio Access (E-UTRA) and NR; Multi-connectivity; Stage 2 (Release 16), Mar. 2020, pp. 1-74.
"3GPP TS 36.331 V16.0.0", 3rd Generation Partnership Project; Technical Specification Group Radio Access Network; Evolved Universal Terrestrial Radio Access (E-UTRA); Radio Resource Control (RRC); Protocol specification (Release 16), Mar. 2020, pp. 1-1048.

"3GPP TS 36.331 V16.2.1", 3rd Generation Partnership Project; Technical Specification Group Radio Access Network; Evolved Universal Terrestrial Radio Access (E-UTRA); Radio Resource Control (RRC); Protocol specification (Release 16), Sep. 2020, pp. 1-1081.
"3GPP TS 36.423 V16.1.0", 3rd Generation Partnership Project; Technical Specification Group Radio Access Network; Evolved Universal Terrestrial Radio Access Network (E-UTRAN); X2 application protocol (X2AP) (Release 16), Mar. 2020, pp. 1-438.
"3GPP TS 38.401 V16.1.0", 3rd Generation Partnership Project; Technical Specification Group Radio Access Network; NG-RAN; Architecture description (Release 16), Mar. 2020, pp. 1-50.
"3GPP TS 38.473 V16.1.0", 3rd Generation Partnership Project; Technical Specification Group Radio Access Network; NG-RAN; F1 application protocol (F1AP) (Release 16), Mar. 2020, pp. 1-240.
"3GPP TS 38.423 V16.1.0", 3rd Generation Partnership Project; Technical Specification Group Radio Access Network; NG-RAN; Xn application protocol (XnAP) (Release 16), Mar. 2020, pp. 1-334.
"3GPP TS 38.300 V16.1.0", 3rd Generation Partnership Project; Technical Specification Group Radio Access Network; NR; NR and NG-RAN Overall Description; Stage 2 (Release 16), Mar. 2020, pp. 1-133.
"3GPP TS 38.331 V16.0.0", 3rd Generation Partnership Project; Technical Specification Group Radio Access Network; NR; Radio Resource Control (RRC) protocol specification (Release 16), Mar. 2020, pp. 1-835.
"3GPP TS 38.331 V16.2.0", 3rd Generation Partnership Project; Technical Specification Group Radio Access Network; NR; Radio Resource Control (RRC) protocol specification (Release 16), Sep. 2020, pp. 1-921.
"3GPP TS 25.331 V15.1.0", 3rd Generation Partnership Project; Technical Specification Group Radio Access Network; Radio Resource Control (RRC); Protocol specification (Release 15), Dec. 2017, pp. 1-2316.
"3GPP TR 38.806 V15.0.0", 3rd Generation Partnership Project; Technical Specification Group Radio Access Network; Study of separation of NR Control Plane (CP) and User Plane (UP) for split option 2; (Release 15), Dec. 2017, op. 1-22.
"3GPP TR 36.805 V9.0.0", 3rd Generation Partnership Project; Technical Specification Group Radio Access Network; Study on Minimization of drive-tests in Next Generation Networks; (Release 9), Dec. 2009, pp. 1-24.
"3GPP TR 38.801 V14.0.0", 3rd Generation Partnership Project; Technical Specification Group Radio Access Network; Study on new radio access technology: Radio access architecture and interfaces (Release 14), Mar. 2017, pp. 1-91.
"3GPP TR 38.804 V14.0.0", 3rd Generation Partnership Project; Technical Specification Group Radio Access Network; Study on New Radio Access Technology; Radio Interface Protocol Aspects (Release 14), Mar. 2017, pp. 1-57.
"3GPP TS 33.501 V16.2.0", 3rd Generation Partnership Project; Technical Specification Group Services and System Aspects; Security architecture and procedures for 5G system (Release 16), Mar. 2020, pp. 1-227.
"3GPP TS 23.501 V16.4.0", 3rd Generation Partnership Project; Technical Specification Group Services and System Aspects; System architecture for the 5G System (5GS); Stage 2 (Release 16), Mar. 2020, pp. 1-430.
"38.331 V16.6.0", 5G; NR; Radio Resource Control (RRC); Protocol specificationETSI TS 138 331 V16.6.0 (Release 16), Oct. 2021, pp. 1-948.

* cited by examiner

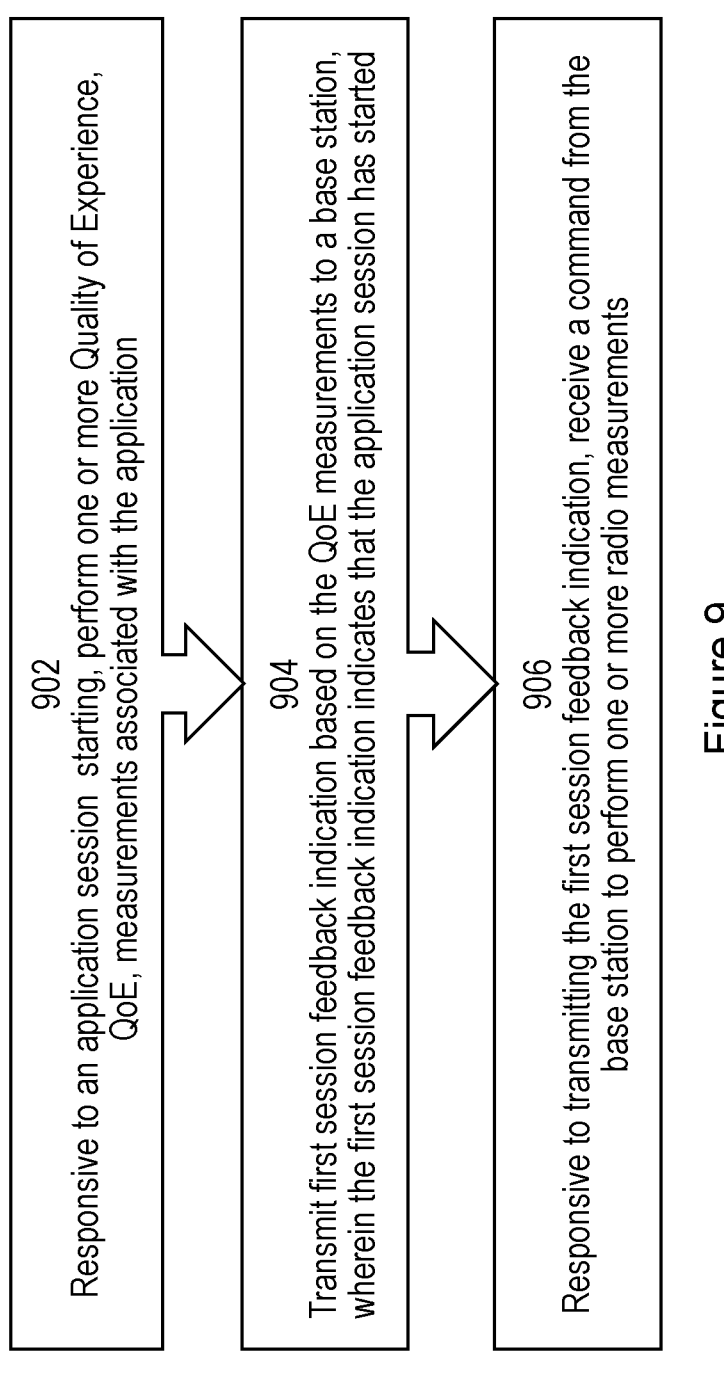

902

Responsive to an application session starting, perform one or more Quality of Experience, QoE, measurements associated with the application

904

Transmit first session feedback indication based on the QoE measurements to a base station, wherein the first session feedback indication indicates that the application session has started

906

Responsive to transmitting the first session feedback indication, receive a command from the base station to perform one or more radio measurements

Figure 9

1002
Receive first session feedback indication based on QoE measurements from a wireless device, wherein the first session feedback indication indicates that an application session has started 1004
Responsive to receiving the first session feedback indication, transmit a command to the wireless device to perform one or more radio measurements 1202
Responsive to an application session starting, performing one or more Quality of Experience, QoE, measurements associated with the application and performing one or more radio measurements

Figure 12

Figure 13:
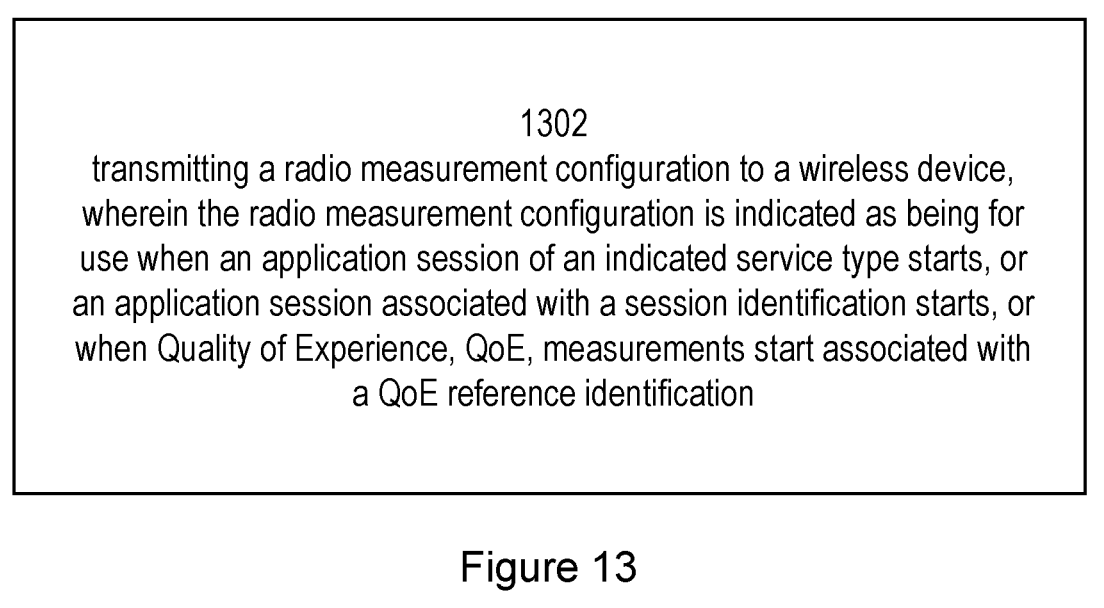

1302
transmitting a radio measurement configuration to a wireless device,
wherein the radio measurement configuration is indicated as being for
use when an application session of an indicated service type starts, or
an application session associated with a session identification starts, or
when Quality of Experience, QoE, measurements start associated with
a QoE reference identification

ALIGNING RADIO RELATED MEASUREMENTS WITH QoE (QUALITY OF EXPERIENCE) MEASUREMENTS

TECHNICAL FIELD

Embodiments described herein relate to methods and apparatuses for performing radio measurements.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

FIG. 1 illustrates a NG-RAN Overall Architecture.

The NG-RAN may comprise of a set of gNBs connected to the 5G Core (5GC) through the Next Generation (NG) interface.

As specified in TS38.300 v 16.3.0, the NG-RAN may also comprise a set of ng-eNBs, an ng-eNB may comprise of an ng-eNB Central Unit (CU) and one or more ng-eNB Distributed Units (DU(s)). An ng-eNB-CU and an ng-eNB-DU is connected via W1 interface. The general principle described in this section may also be applied to ng-eNB (instead of gNB) and W1 interface (instead of the F1 interface), if not explicitly specified otherwise.

An gNB can support Frequency Division Duplex (FDD) mode, Time Division Duplex (TDD) mode or dual mode operation.

gNBs may be interconnected through the Xn-C interface.

A gNB may comprise a gNB-CU and one or more gNB-DU(s). A gNB-CU and a gNB-DU is connected via F1 interface.

One gNB-DU may be connected to only one gNB-CU.

In case of network sharing with multiple cell identification (ID) broadcast, each Cell Identity associated with a subset of Public Land Mobile Networks (PLMNs) may correspond to a gNB-DU and the gNB-CU it is connected to, i.e. the corresponding gNB-DUs share the same physical layer cell resources.

For resiliency, a gNB-DU may be connected to multiple gNB-CUs by appropriate implementation.

In FIG. 1, NG, Xn-C and F1 are logical interfaces.

For NG-RAN (as illustrated in FIG. 1), the NG and Xn-C interfaces for a gNB comprising a gNB-CU and gNB-DUs, terminate in the gNB-CU. For E-UTRAN-NR Dual Connectivity (EN-DC), the S1-U and X2-C interfaces for a gNB comprising a gNB-CU and gNB-DUs, terminate in the gNB-CU. The gNB-CU and connected gNB-DUs may only be visible to other gNBs and the 5GC as a gNB.

The node hosting user plane part of New Radio (NR) Packet Data Convergence Protocol (PDCP) (e.g. gNB-CU, gNB-CU-UP, and for EN-DC, Master eNB (MeNB) or Secondary gNB (SgNB) depending on the bearer split) shall perform user inactivity monitoring and further informs its inactivity or (re) activation to the node having C-plane connection towards the core network (e.g. over E1, X2). The node hosting NR Radio Link Control (RLC) (e.g. gNB-DU) may perform user inactivity monitoring and further inform its inactivity or (re) activation to the node hosting control plane, e.g. gNB-CU or gNB-CU-CP.

Uplink (UL) Packet Data Convergence Protocol (PDCP) configuration (i.e. how the UE uses the UL at the assisting node) is indicated via X2-C (for EN-DC), Xn-C (for NG-RAN) and F1-C. Radio Link Outage/Resume for Downlink (DL) and/or UL is indicated via X2-U (for EN-DC), Xn-U (for NG-RAN) and F1-U.

The NG-RAN is layered into a Radio Network Layer (RNL) and a Transport Network Layer (TNL).

The NG-RAN architecture, i.e. the NG-RAN logical nodes and interfaces between them, is defined as part of the RNL.

For each NG-RAN interface (NG, Xn, F1) the related TNL protocol and the functionality are specified. The TNL provides services for user plane transport, signalling transport.

In NG-Flex configuration, each NG-RAN node is connected to all Access and Mobility Management Function (AMFs) of AMF Sets within an AMF Region supporting at least one slice also supported by the NG-RAN node.

FIG. 2 illustrates an overall architecture for the separation of gNB-CU-CP and gNB-CU-UP.

A gNB may comprise a gNB-CU-CP, multiple gNB-CU-UPs and multiple gNB-DUs. The gNB-CU-CP may be connected to the gNB-DU through the F1-C interface. The gNB-CU-UP may be connected to the gNB-DU through the F1-U interface. The gNB-CU-UP may be connected to the gNB-CU-CP through the E1 interface. One gNB-DU may be connected to only one gNB-CU-CP. One gNB-CU-UP may be connected to only one gNB-CU-CP.

For resiliency, a gNB-DU and/or a gNB-CU-UP may be connected to multiple gNB-CU-CPs by appropriate implementation.

One gNB-DU may be connected to multiple gNB-CU-UPs under the control of the same gNB-CU-CP. One gNB-CU-UP may be connected to multiple DUs under the control of the same gNB-CU-CP.

The connectivity between a gNB-CU-UP and a gNB-DU may be established by the gNB-CU-CP using Bearer Context Management functions. The gNB-CU-CP may select the appropriate gNB-CU-UP(s) for the requested services for the UE. In case of multiple CU-UPs they belong to same security domain as defined in TS 33.210 v16.4.0.

Data forwarding between gNB-CU-UPs during intra-gNB-CU-CP handover within a gNB may be supported by Xn-U.Quality of Experience (QoE) measurements have been specified for Long Term Evolution (LTE) and Universal Mobile Telecommunications System (UMTS). The purpose of the QoE measurements is to measure the end user experience when using certain applications. Currently QoE measurements for streaming services and for MTSI (Mobility Telephony Service for IMS) services are supported.

The solutions in LTE and UMTS are similar with the overall principles as follows. Quality of Experience Measurement Collection enables configuration of application layer measurements in the UE and transmission of QoE measurement result files by means of RRC signalling. Application layer measurement configuration received from Operation and Maintenance (OAM) or from OAM via the core network (CN) to RAN is encapsulated in a transparent container, which is forwarded to UE in a downlink Radio Resource Control (RRC) message. Application layer measurements received from UE's higher layer are encapsulated in a transparent container and sent to network in an uplink RRC message. The resulting container may then forwarded to a TCE, Trace Collector Entity or MCE, Measurement Collector Entity In 3GPP release 17 a new RAN study item for "Study on NR Quality of Experience (QoE) management and optimizations for diverse services" for NR has been approved. The purpose of the study item is to study solutions for QoE measurements in NR. QoE management in NR will not just collect the experience parameters of streaming services but also consider the typical performance requirements of diverse services (e.g. Augmented Reality/Virtual Reality (AR/VR) and Ultra-Reliable Low-Latency Communication (URLLC)). Based on requirements of services, the NR study will also include more adaptive QoE management schemes that enable network intelligent optimization to satisfy user experience for diverse services.

The measurements may be initiated towards RAN in management-based manner, i.e. from an OAM node in a generic way e.g. for a group of UEs, or they may also be initiated in a signaling-based manner, i.e. initiated from OAM via the Core Network (CN) to the RAN e.g. for a single UE. The configuration of the measurement includes the measurement details, which is encapsulated in a container that is transparent to RAN.

When initiated via the core network, the measurement is started towards a specific UE. For the Long Term Evolution (LTE) case, the "TRACE START" S1AP message is used, which carries, among others, the details about the measurement configuration the application should collect (in the "Container for application layer measurement configuration" Information Element (IE), which is transparent to RAN) and the details to reach the trace collection entity to which the measurements should be sent.

The RAN is not aware of when an application in the UE that should report QoE measurements is active or not and also the UE Access Stratum is not aware of when the measurements are ongoing e.g. for a streaming session. It is an implementation decision as to when RAN stops the measurements. Typically, it is done when the UE has moved outside the measured area.

One opportunity provided by a legacy solution is also to be able to keep the QoE measurement for the whole session, even during handover situation.

FIG. 3 illustrates a UE capability enquiry procedure with UTRAN.

According to 3GPP TS 25.331 v 16.1.0, UTRAN can request the UE (via "UE Capability Enquiry") to report its capability, as shown in FIG. 3.

FIG. 4 illustrates transmission of UE capability information with UTRAN.

The UE can provide its capability using the "UE Capability Information" RRC message as shown in FIG. 4.

The "UE Capability Information" message may include the "UE radio access capability" (see excerpt below from 3GPP TS 25.331 v16.1.0 section 10.3.3.42).

The "Measurement Capability" IE may be used by the UE to transfer to the UTRAN the information related to the capability to perform the QoE measurement collection for streaming services and/or MTSI services (see 3GPP TS 25.331 v16.1.0 section 10.3.3.21).

To configure QoE measurements in the UE, the UTRAN can send a "Measurement Control" RRC message containing "Application layer measurement configuration" (see 3GPP TS 25.331 v16.1.0 section 10.3.7.143).

FIG. 5 illustrates a measurement control message from UTRAN as described above.

The UE can send QoE measurement results via UTRAN to the Collecting Entity using the "Measurement Report" RRC message and including the "Application layer measurement reporting" IE.

FIG. 6 illustrates a measurement report to UTRAN as described above.

The UE may also perform Cell Update with cause "application layer measurement report available" in order to initiate the transfer of application layer measurement report.

Signalling radio bearer RB4 may be used for the MEASUREMENT REPORT message carrying the IE "Application layer measurement reporting" (see 3GPP TS 25.331 v16.1.0 section 10.3.7.144) For E-UTRAN, the UE capability transfer is used to transfer UE radio access capability information from the UE to E-UTRAN.

FIG. 7 illustrates an example of UE capability transfer with E-UTRAN.

The UE-EUTRA-Capability IE is used to convey the E-UTRA UE Radio Access Capability Parameters and the Feature Group Indicators for mandatory features to the network.

In the response message "UECapabilityInformation", the UE can include the "UE-EUTRA-Capability" IE. The "UE-EUTRA-Capability" IE may include the UE-EUTRA-Capability-v1530-IE which can be used by the UE to indicate whether the UE supports or not QoE Measurement Collection for streaming services and/or MTSI services, as detailed in the "MeasParameters-v1530" encoding in TS 36.331 v16.2.1 section 6.3.6.

The purpose of the "Application layer measurement reporting" procedure described in 3GPP TS 36.331 v16.2.1 and shown in FIG. 8 is to inform E-UTRAN about application layer measurement report.

FIG. 8 illustrates an example of application layer measurement reporting with E-UTRAN A UE capable of application layer measurement reporting in RRC_CONNECTED may initiate the procedure when configured with application layer measurement, i.e. when measConfigAppLayer has been configured by E-UTRAN.

Upon initiating the procedure, the UE shall:

1> if configured with application layer measurement, and SRB4 is configured, and the UE has received application layer measurement report information from upper layers:

2> set the measReportAppLayerContainer in the MeasReportAppLayer message to the value of the application layer measurement report information;

2> set the service Type in the MeasReportAppLayer message to the type of the application layer measurement report information;

2> submit the MeasReportAppLayer message to lower layers for transmission via SRB4.

The RRCConnectionReconfiguration message is used to reconfigure the UE to setup or release the UE for Application Layer measurements. This is signaled in the measConfigAppLayer-15 Information Element (IE) within the "OtherConfig" IE.

The setup includes the transparent container measConfigAppLayerContainer which specifies the QoE measurement configuration for the Application of interest and the serviceType IE to indicates the Application (or service) for which the QoE measurements are being configured. Supported services are streaming and MTSI. The details for the measConfigAppLayer IE are give in TS 36.331 v16.2.1 section 6.3.6.

As specified in 3GPP TS 36.331 v16.2.1, the MeasReportAppLayer RRC message is used by the UE to send to the E-UTRAN node the QoE measurement results of an Application (or service). The service for which the report is being sent is indicated in the "serviceType" IE.

The details for the MeasReportAppLayer message, sent using Signalling Radio Bearer, SRB4 are given in TS 36.331 v16.2.1 section 6.2.2.

As part of LTE specification 28.405 v16.0.0, RAN nodes are allowed to temporarily stop and restart the QoE measurement reporting when an overload situation is observed at RAN nodes.

There currently exist certain challenge(s).

In the existing solution, radio related measurements may be ongoing for a long period of time, both if the UE is a connected state (i.e. RRC_CONNECTED state) or if the UE is inactive or idle (i.e. RRC_INACTIVE or RRC_IDLE state). QoE measurements on the other hand, are only performed when a certain application is active and running, e.g. when there is an ongoing session in the application layer. In the existing solution, it is only the applications in the UE that know when QoE measurements are collected.

Another related problem is that MDT measurements for UEs in RRC_CONNECTED (e.g. the only state where QoE measurements are performed) are not logged, but the measured results are sent as fields in an RRC message, MeasurementReport, either periodically or when a certain event is fulfilled.

SUMMARY

According to some embodiments there is provided a method performed by a wireless device for performing measurements. The method comprises responsive to an application session starting, performing one or more Quality of Experience, QoE, measurements associated with the application; transmitting a first session feedback indication based on the QoE measurements to a base station, wherein the first session feedback indication indicates that the application session has started; and responsive to transmitting the first session feedback indication, receiving a command from the base station to perform one or more radio measurements.

According to some embodiments there is provided a method performed by a base station for performing measurements. The method comprises receiving first session feedback indication based on QoE measurements from a wireless device, wherein the first session feedback indication indicates that an application session has started; and responsive to receiving the session feedback indication, transmitting a command to the wireless device to perform one or more radio measurements.

According to some embodiments there is provided a wireless device for performing measurements. The wireless device comprises processing circuitry configured to cause the wireless device to: responsive to an application session starting, perform one or more Quality of Experience, QoE, measurements associated with the application; transmit a first session feedback indication based on the QoE measurements to a base station, wherein the first session feedback indication indicates that the application session has started; and responsive to transmitting the first session feedback indication, receive a command from the base station to perform one or more radio measurements.

According to some embodiments there is provided a base station for performing measurements. The base station comprises processing circuitry configured to cause the base station to: receive first session feedback indication based on QoE measurements from a wireless device, wherein the first session feedback indication indicates that an application session has started; and responsive to receiving the session feedback indication, transmit a command to the wireless device to perform one or more radio measurements.

BRIEF DESCRIPTION OF THE DRAWINGS

For better understanding of the present disclosure, and to show how it may be put into effect, reference will now be made, by way of example only, to the accompanying drawings, in which:

FIG. 9 illustrates a method in accordance with some embodiments. The method may be performed by a wireless device (or a UE);

FIG. 11 illustrates a signalling diagram according to some embodiments;

FIG. 12 illustrates a method in accordance with some embodiments. The method may be performed by a wireless device (or a UE);

FIG. 13 illustrates a method in accordance with some embodiments. The method may be performed by a base station;

FIG. 14 illustrates a signalling diagram according to some embodiments;

FIG. 15 illustrates a wireless network in accordance with some embodiments;

DESCRIPTION

Figure 1:
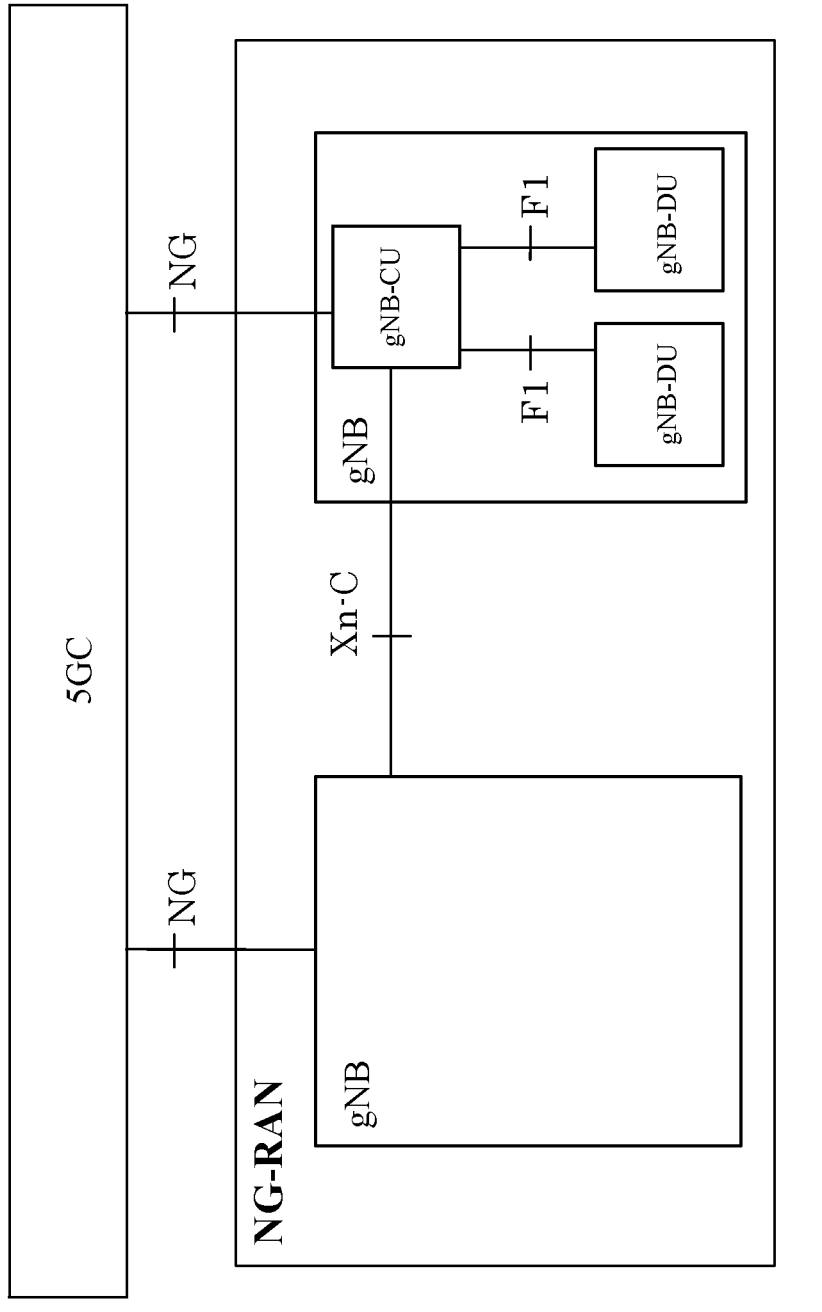
FIG. 1 illustrates a NG-RAN Overall Architecture.
Figure 2:
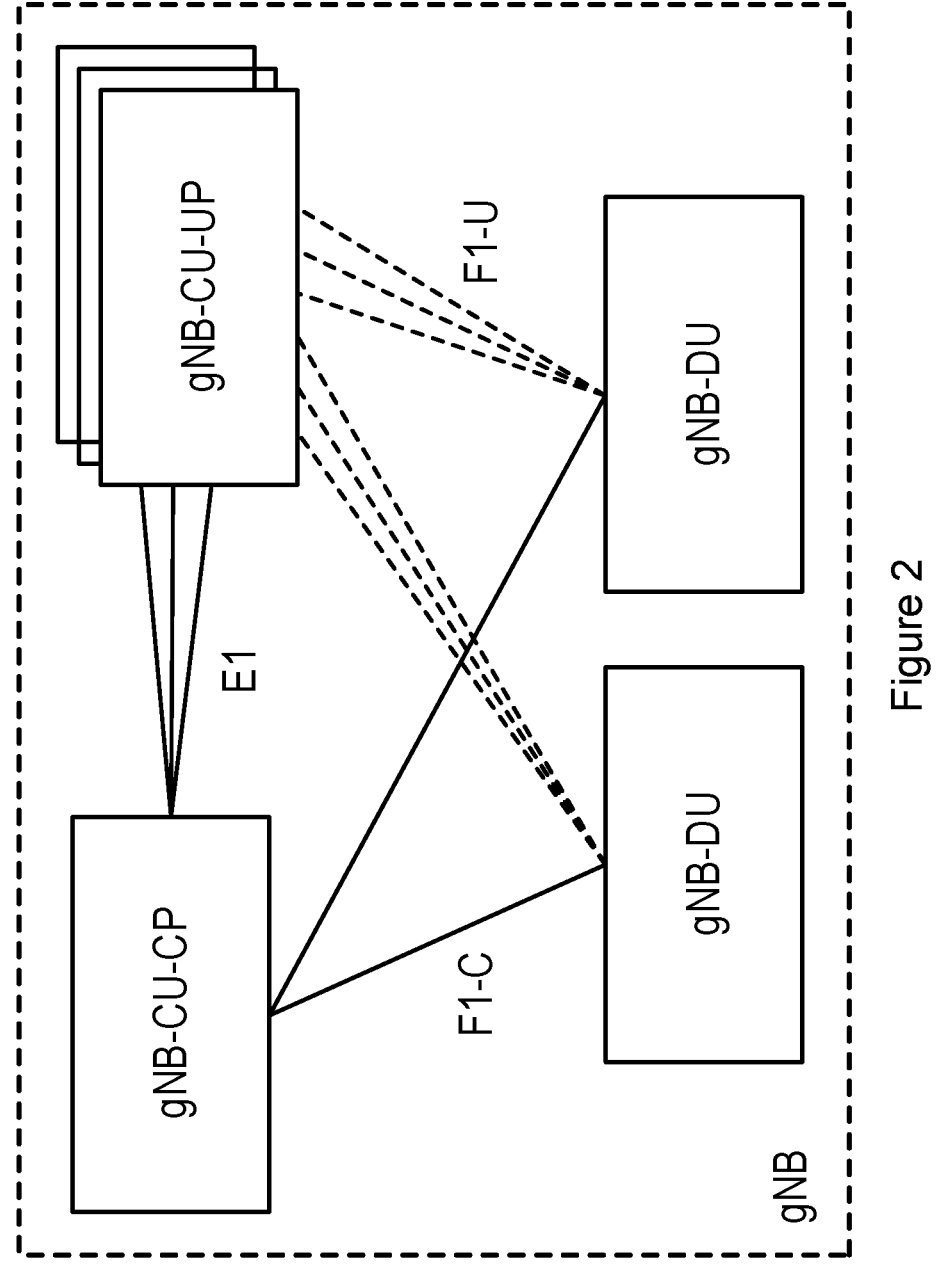
FIG. 2 illustrates an overall architecture for the separation of gNB-CU-CP and gNB-CU-UP.
Figure 3:
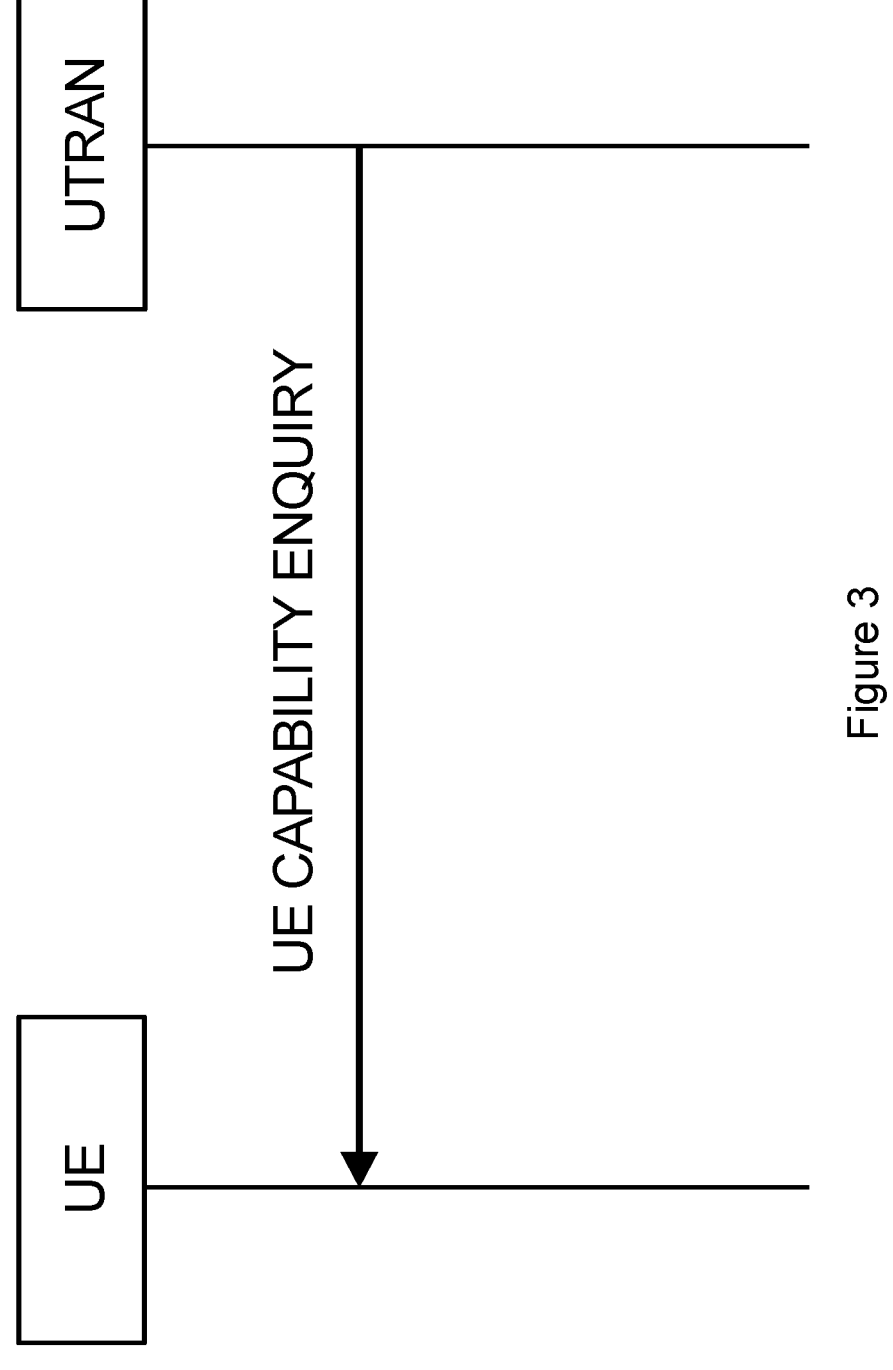
FIG. 3 illustrates a UE capability enquiry procedure with UTRAN.
Figure 4:
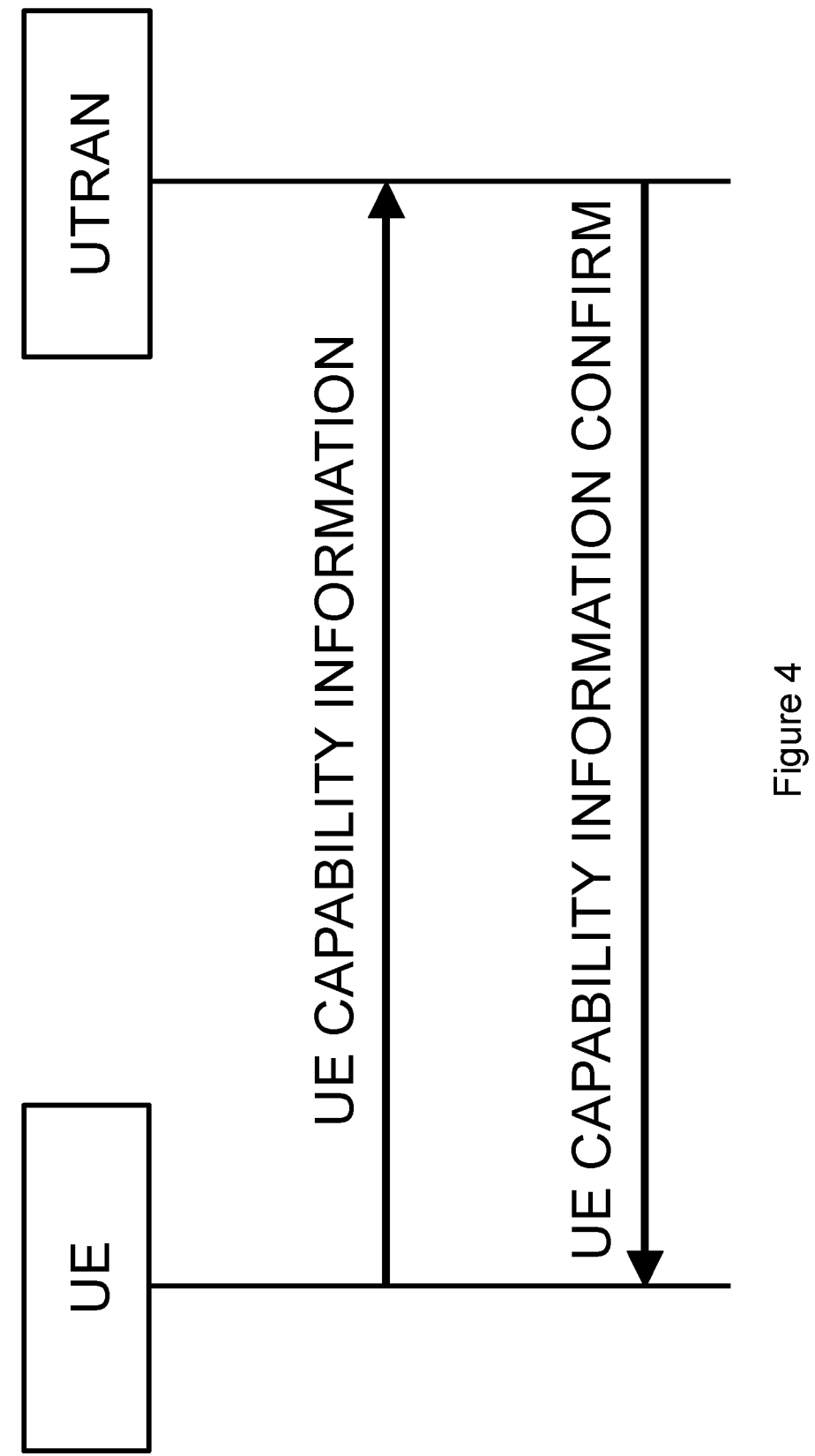
FIG. 4 illustrates transmission of UE capability information with UTRAN.
Figure 5:
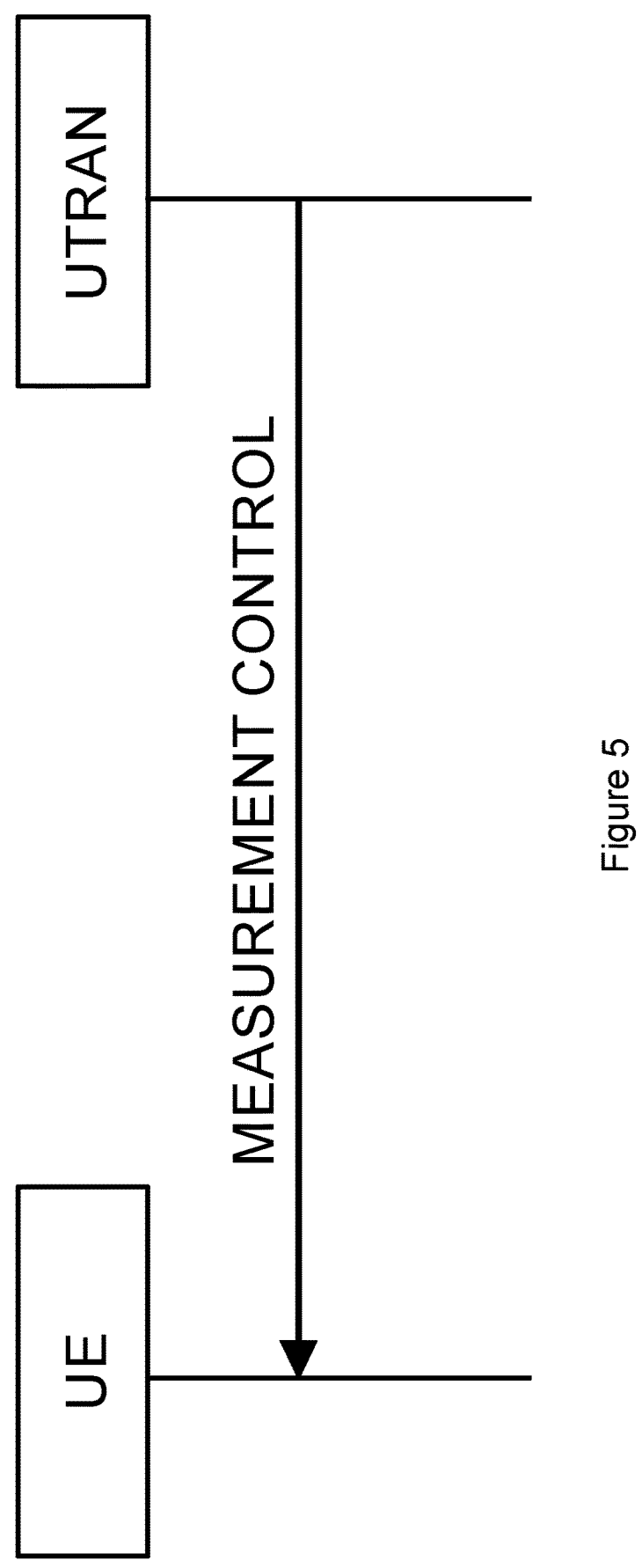
FIG. 5 illustrates a measurement control message from UTRAN as described above.
Figure 6:
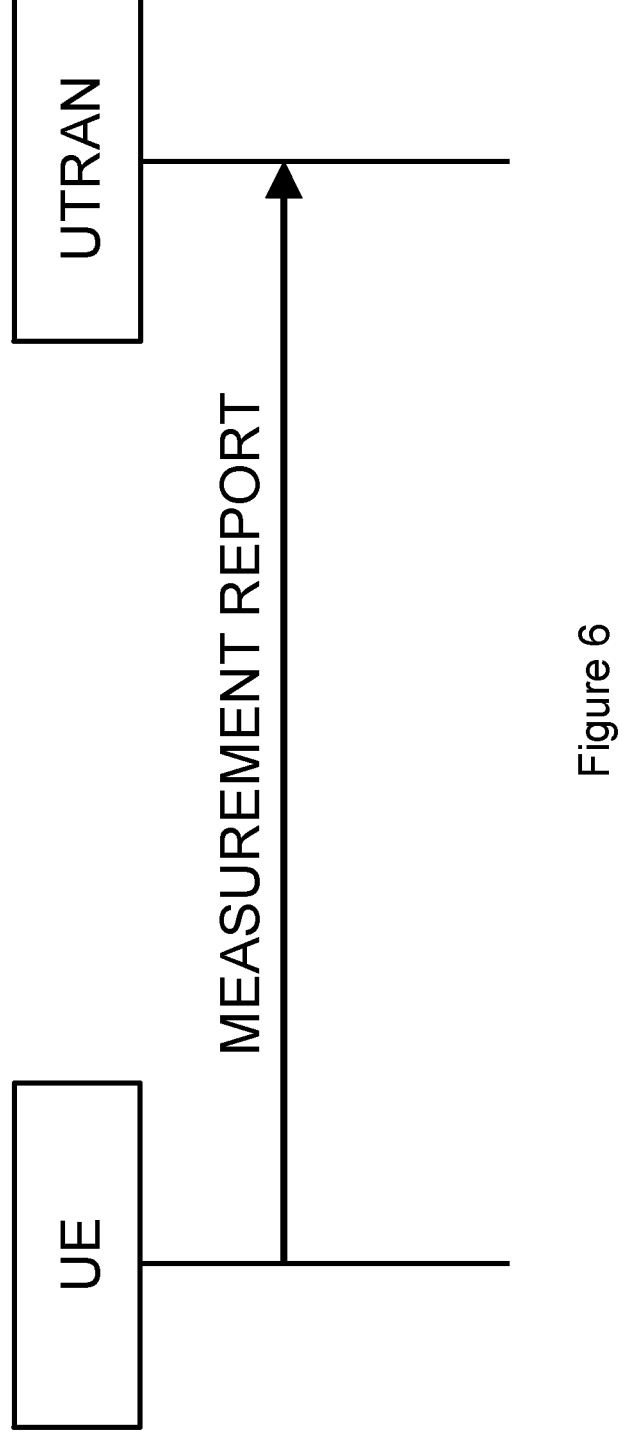
FIG. 6 illustrates a measurement report to UTRAN as described above.
Figure 7:
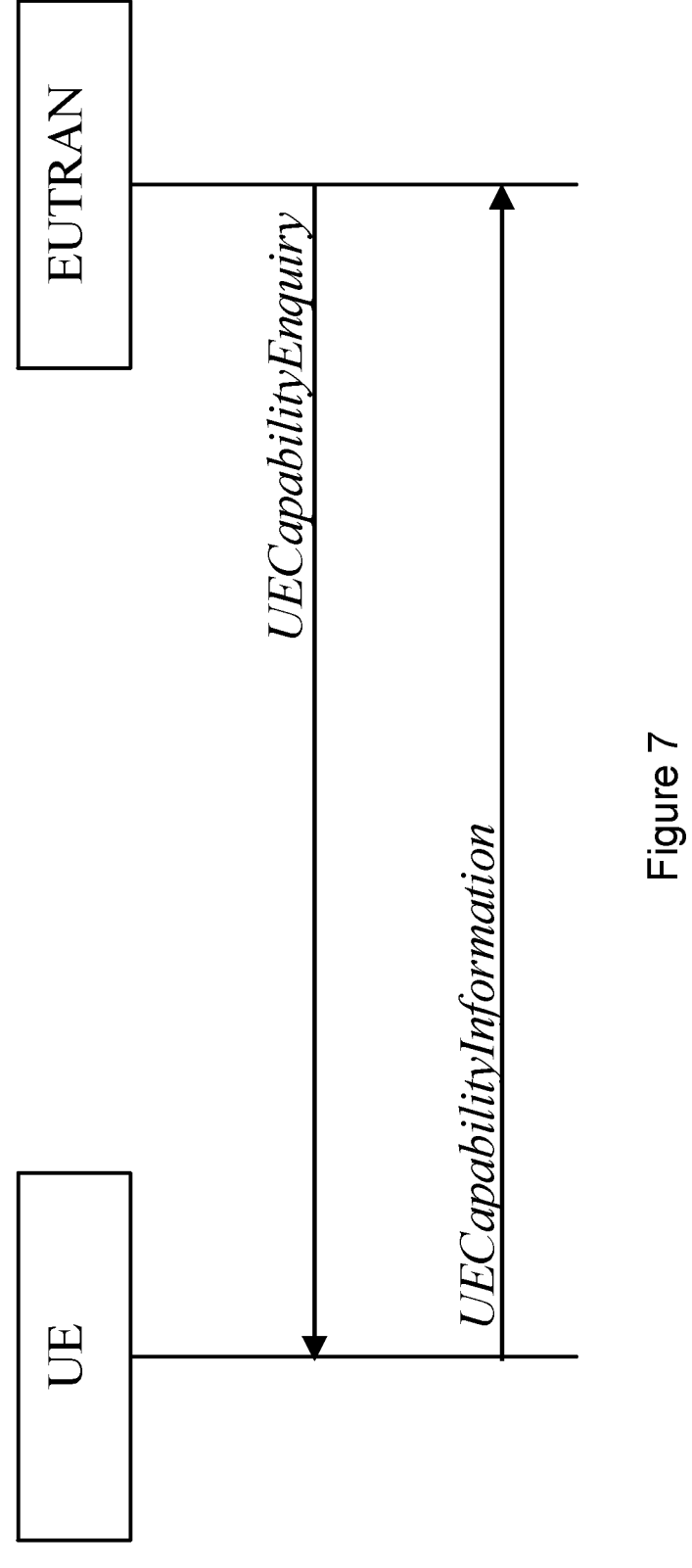
FIG. 7 illustrates an example of UE capability transfer with E-UTRAN.
Figure 8:
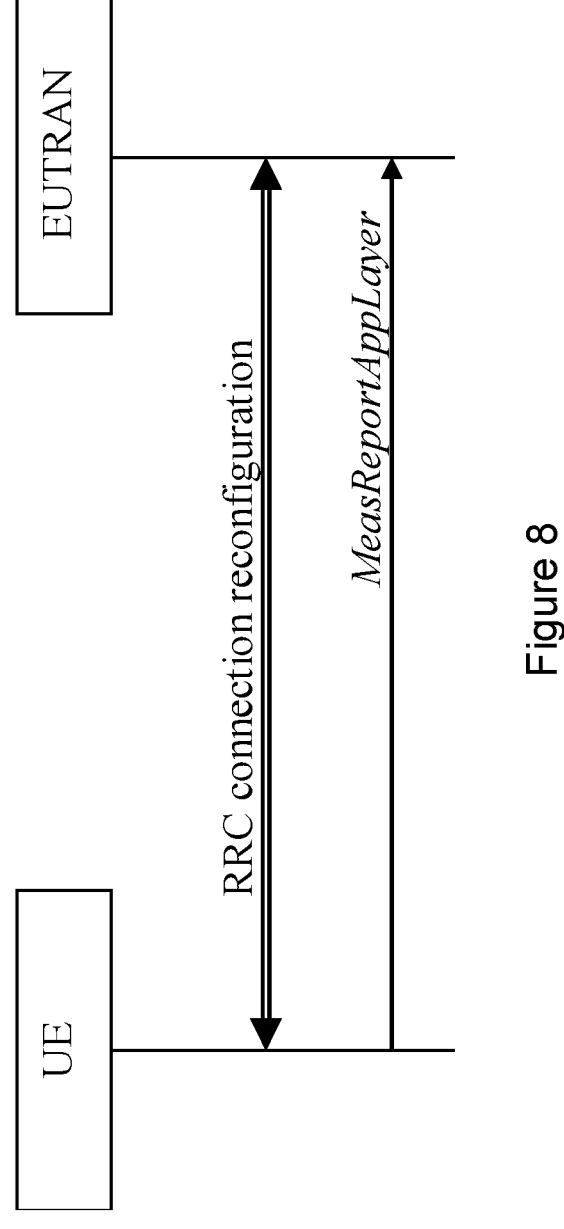
FIG. 8 illustrates an example of application layer measurement reporting with E-UTRAN.

Certain aspects of the present disclosure and their embodiments may provide solutions to the challenges discussed above, or other challenges.

If there is a desire to analyze QoE measurements and radio related measurements together, e.g. to check the radio conditions at the time when the QoE measurements took place, it may be unnecessary to receive radio measurements for a very long period of time, since the QoE measurements were performed during a much shorter period of time. It may also be considered unnecessary to receive radio measurements when no QoE measurements are being recorded. In the existing solution it is the RAN that starts and stops the MDT measurement collection (a type of radio measurement), and it does not have any knowledge of when QoE measurements are collected in the UE.

Furthermore, the formats of the QoE measurements and radio related measurements are different, which may complicate the post-processing of the different types of measurements.

In some embodiments described herein methods and apparatuses are provided to improve the analysis or post-processing of application layer measurements (e.g. QoE measurement) and radio layer measurements (e.g., MDT measurement or layer 2 measurements) by using a session feedback indication as a trigger to start or stop radio measurements.

Some methods described herein may also use a service type indication, QoE reference Indication, or UE Request Session ID as part of radio measurement configuration (e.g., ReportConfigNR in TS 38.331 rel-16) to associate the radio measurement to a target application/service or session.

The UE may be preconfigured with a radio measurement configuration that may remain pending until the UE RRC layer receives a feedback indication from the application layer, indicating that the target session is started or indicating that the QoE measurement concerning the target session associated to the target service type is started. In examples where such an indication is received from the application layer before the radio measurement configuration is configured (and no indication is received indicating that the session has stopped), the radio measurement configuration may be started/activated immediately.

Methods and apparatuses described herein may align the formats of the reports of QoE measurements and radio related measurements.

Embodiments described herein may use a session feedback indication as a trigger to start performing or collecting radio related measurements. In addition, a network node may transmit an indication as part of radio measurement configuration e.g., ReportConfigNR to relate the measurement configuration to a target service type. This would assist the network to send a pending radio configuration to the UE which remains pending until the application starts a session concerning the target service. Then wireless device may then run the radio measurement associated to the configured service type as part of ReportConfigNR.

There are, proposed herein, various embodiments which address one or more of the issues disclosed herein.

Certain embodiments may provide one or more of the following technical advantage(s). An advantage of embodiments described herein is the avoidance of collecting certain radio related measurements during a period of time where QoE measurements are not ongoing. This limits the collection of measurements during a time when the measured result is of little interest, thereby saving resources spent for transmission of measurement reports as well as resources spent in the UE for performing measurements.

In other words, embodiments of the present disclosure provide an alignment between radio layer measurements (such as MDT and Layer 2 (L2) measurements) and application layer measurements. By leveraging the embodiments described herein, it may be possible for the network node to run the network/radio layer measurements selectively (or only) when QoE measurements are running or when a session is started in an application that is subject to the QoE measurement.

Therefore, a time aligned QoE measurements and radio layer measurements such as MDT and layer 2 measurements makes the correlation and post-processing of the collected measurement files easier. Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

The terms "UE", "wireless device", "terminal equipment" and "wireless terminal" are used interchangeably.

The terms Measurement Collector Entity (MCE) and Trace Collector Entity (TCE) are used interchangeably.

The terms "network node" and "RAN node" are used interchangeably, where the RAN node can be a gNB, eNB, gNB-CU, gNB-CU-CP, eNB-CU, eNB-CU-CP, IAB-donor, IAB-donor-CU, IAB-donor-CU-CP, RNC, Node B.

The terms "application layer measurement", "application measurement" and "QoE measurement" are used interchangeably.

The terms "MDT/trace measurement", "radio layer measurement", "radio measurement" and "radio related measurement" are used interchangeably.

The terms "linked measurements", "synched measurements", "synchronized measurements" and "coupled measurements" are used interchangeably.

The terms "modem", "radio layer", "RRC layer" and "radio network layer" are used interchangeably.

The terms access stratum and radio layer are used interchangeably.

Techniques disclosed herein apply to UMTS, LTE and NR in various embodiments.

All references to the application layer are with respect to the application layer of the UE (since RAN nodes do not have an application layer).

Techniques disclosed herein apply to both signaling- and management-based MDT and QoE measurements in various embodiments.

The terms O&M and OAM are used interchangeably.

The terms O&M and OAM represent a system that is responsible for management, administration, maintenance, orchestration, provisioning, fault supervision etc. in a 3GPP system.

FIG. 9 illustrates a method in accordance with some embodiments. The method may be performed by a wireless device (or a UE).

FIG. 9 depicts a method in accordance with particular embodiments, the method begins at step 902 with responsive to an application session starting, performing one or more Quality of Experience, QoE, measurements associated with the application. In step 904 the method comprises transmitting a first session feedback indication based on the QoE measurements to a base station, wherein the first session feedback indication indicates that the application session has started. In step 906 the method comprises, responsive to transmitting the first session feedback indication, receiving a command from the base station to perform one or more radio measurements.

Figure 10:
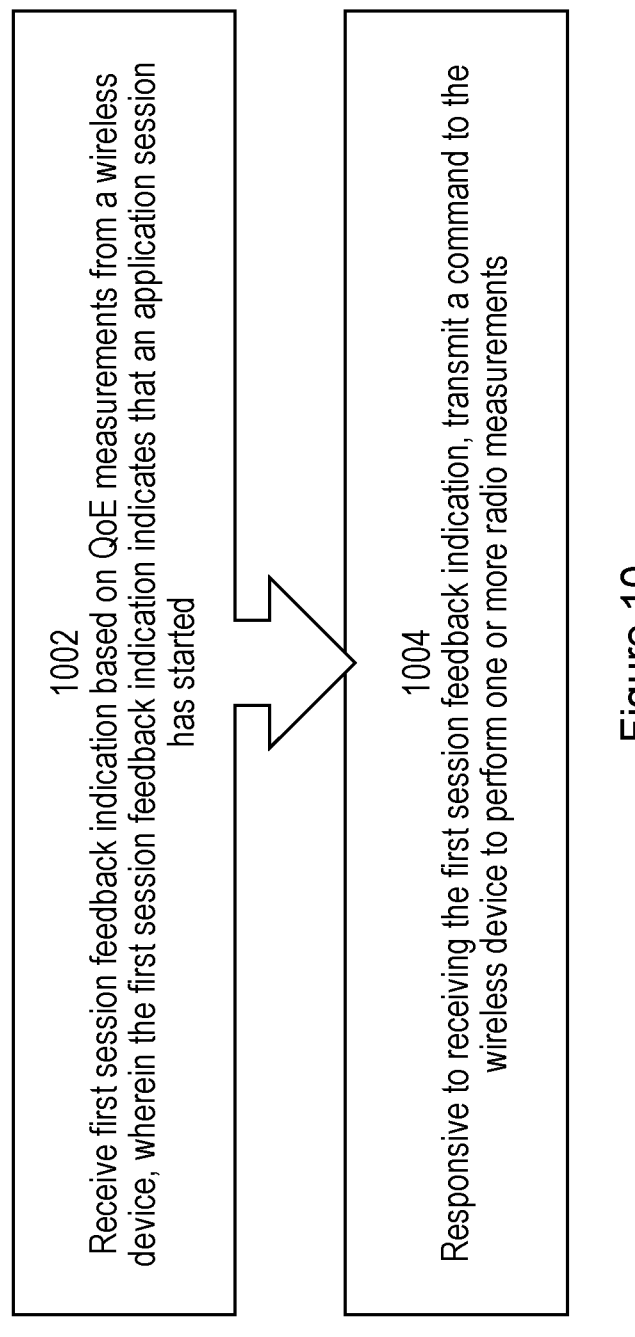
FIG. 10 illustrates a method in accordance with some embodiments. The method may be performed by a base station. The base station may comprise a RAN node, e.g. gNB or a gNB-CU or eNB.

FIG. 10 illustrates a method in accordance with some embodiments. The method may be performed by a base station. The base station may comprise a RAN node, e.g. gNB or a gNB-CU or eNB, FIG. 10 depicts a method in accordance with particular embodiments, the method begins at step 1002 with receiving a first session feedback indication based on QoE measurements from a wireless device, wherein the first session feedback indication indicates that an application session has started. In step 1004 the method comprises responsive to receiving the first session feedback indication, transmitting a command to the wireless device to perform one or more radio measurements.

The methods of FIGS. 9 and 10 utilize a session feedback indication to trigger the performance of radio measurements.

Figure 11:
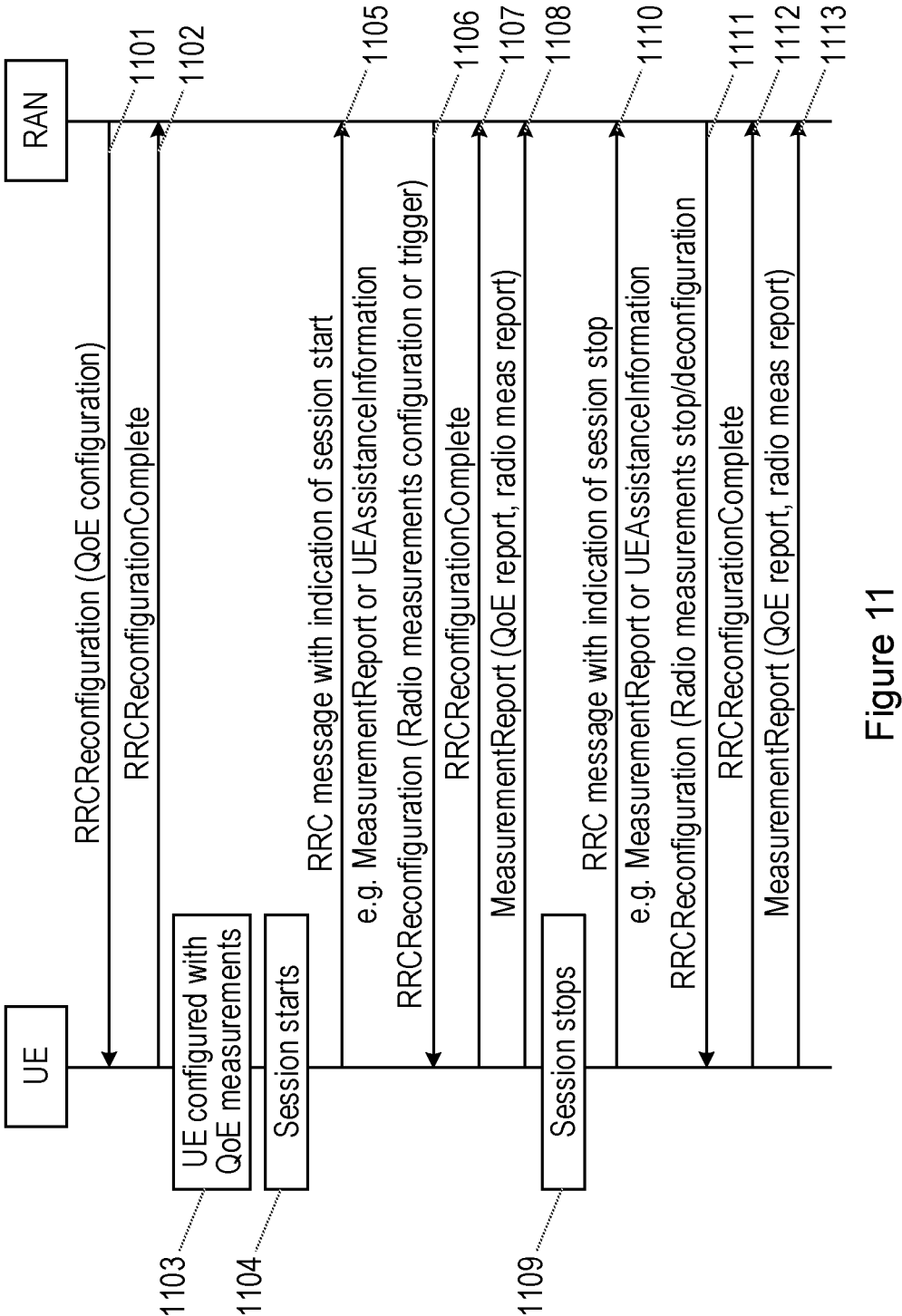
FIG. 11 illustrates the methods of 9 and 10 in more detail. In particular.

FIG. 11 illustrates the methods of 9 and 10 in more detail. In particular, FIG. 11 illustrates a signalling diagram according to some embodiments.

In step 1101, the network configures the UE with QoE measurements. The measurements may start right away or after a period of time when the application, for which the QoE measurements are configured, is started. For example, the network may transmit a RRCReconfiguration (QoE configuration) message.

In step 1102, the UE may acknowledge completion of the configuration e.g. with a RRCReconfigurationComplete message.

In step 1103, the UE is then configured with a QoE measurement configuration (e.g. QoE configured with QoE measurements).

In step 1104, an application session then starts (e.g. session starts). Upon starting a session on the target service/application, the QoE measurements start (This step may correspond to step 902 of FIG. 9).

In step 1105, when the QoE measurements start (and as an example of step 904 of FIG. 9), the application layer in the UE sends the session feedback indication from the application layer to the RRC layer in the UE, and the indication is transmitted to the network in a message, e.g. an RRC message e.g. MeasurementReport or measReportAppLayer. For example, the UE may transmit an RRC message with indication of session start e.g. MeasurementReport or UEAssistanceInformation.

In some examples, the session feedback indication may comprise an indication of a service type of the application or QoE reference ID. In other words, the application sends a feedback indication to the RRC layer indicating which service stopped or started. The RRC layer may also send a feedback indication to the network node (e.g. base station) including an indication of the service type or QoE reference ID.

In step 1106, when the network node receives the session feedback indication (which may correspond to step 1002 of FIG. 10), it may use the session feedback indication as a trigger to configure the UE with certain radio measurements, e.g. certain MDT measurements or certain layer 2 measurements e.g. PDCP delay. For example, the network may transmit an RRCReconfiguration (Radio measurements configuration or trigger) message to the UE.

The specific radio measurements may be used as a tool to understand why the Quality of Experience is a certain way. Which radio measurements, and how they will be used in conjunction with QoE measurements, may have been configured beforehand. This analysis may be performed by a TCE, an O&M entity or a network node such as a RAN node, e.g. a gNB or an eNB.

In an alternative solution, the radio related measurement configuration has been already sent to the UE and the message transmitted in step 1106) may comprise an indication to the UE to start the previously configured radio measurements. Such an indication may be sent e.g. in an RRC message or in a MAC Control Element (MAC CE).

As a variation, the RAN node may, in the message activating previously configured radio related measurements, indicate a subset of the configured measurements to be activated (where all could be part of a measurement configuration with a common measurement ID (measId)), or indicate one or a subset of a set of previously conveyed measurement configurations (where each of the measurement configurations in the set could have its own measurement ID (measId).

In yet another alternative step 1106 may comprise an indication to start recording the radio measurements in a file.

In examples in which a radio related measurement configuration has not been previously sent to the UE, the UE may suggest to the network a set of radio related measurements to be configured that are of particular interest, e.g. in consideration of the service type or service types for which the session(s) has/have been started As an example, if UL PDCP average delay has not been specified yet as part of the radio related measurement, but the application is time critical, the UE may suggest reporting such measurement.

The UE can make an unsolicited suggestion also based on certain type of network events (e.g. signal quality below a certain threshold).

In examples in which the radio related measurement configuration has been previously sent to the UE, the UE may indicate to the network a subset of such radio related measurements that are of particular interest, considering for example the service type or service types for which the session(s) has/have been started, or may suggest to the network the configuration of additional radio related measurements.

In step 1106 the network node may therefore transmit a command to the wireless device to perform the one or more radio measurements. Step 1106 may correspond to step 906 of FIG. 9 and step 1004 of FIG. 10. The command may comprise an RRC message to the UE. The command may comprise a configuration of radio related measurements, e.g.

RRM measurements, MDT measurements or L2 measurements. In some examples, the command may instruct the wireless device to perform one or more measurements from a preconfigured measurement configuration.

In step 1107 the UE acknowledges the command received in step 1106. For example, the UE may transmit an RRCReconfigurationComplete message to the network.

In step 1108, the UE may transmit a measurement report to the network. For example, the UE may transmit a MeasurementReport (QoE report, radio measurement report) message to the network. The measurement report may comprise results of the one or more radio measurements and/or the one or more QoE measurements.

In step 1109, the QoE measurements stop or pause. The QoE measurements may stop responsive to the application session stopping (e.g. session stops). The QoE measurements may pause responsive to a request form the network. When the QoE measurements stop, the application layer in the UE may transmit a session feedback indication from the application layer to the RRC layer in the UE, and the indication may be transmitted to the network in a message, e.g. an RRC message e.g. MeasurementReport. In other words, responsive to the one or more QoE measurements stopping or pausing, the UE may transmit second session feedback indication to the base station indicating that the QoE measurements have stopped or paused.

In step 1110, upon receiving the second session feedback indication from the RRC layer (e.g., session feedback indication) indicating the stop or pause of the QoE measurement or indicating the stop or pause of the ongoing session, the network node may stop or pause the radio measurements (or network layer measurements). For example, the UE may transmit an RRC message with an indication of session stop (e.g. MeasurementReport or UEAssistanceInformation)

In other words, responsive to receiving the second session feedback indication from the wireless device, the base station may transmit, to the wireless device, a command to terminate or pause the one or more radio measurements in step 1111. In some examples, the step 1111 message comprises an indication to stop recording the radio measurements in a file. For example, the network may transmit an RRCReconfiguration (Radio measurements stop/deconfiguration) message to the UE.

The UE (the RRC layer) may continue the one or more radio measurements until it receives the command from the network node.

In some examples, the UE (and the RRC layer) may autonomously stop or pause the radio measurements upon receiving the second feedback indication from the application, indicating the stop of the ongoing session or the pertaining QoE measurements. In other words, responsive to the application session stopping or pausing, the wireless device may terminate or pause the one or more radio measurements.

In step 1112, the UE acknowledges the command received in step 1111. For example, the UE may transmit an RRCReconfigurationComplete message to the network.

In step 1113, the UE may transmit a measurement report containing any radio measurements or QoE measurements that have not been paused by the network. For example, the UE may transmit a MeasurementReport (QoE report, radio measurement report) message to the network.

In examples in which the QoE measurements are paused, when the QoE measurements resume, the resumption of MDT/L2 measurements may be enabled in different ways:

In one embodiment, the network may instruct the UE to resume both the QoE and MDT/L2 measurements (e.g. in the same message).

In another embodiment, the network may instruct the UE to resume the QoE measurements, where this would be an implicit indication for the UE to also resume the L2/MDT measurements.

In another embodiment, the network may instruct the UE to resume the QoE measurements and as a consequence the application layer in the UE may send an indication to the RRC layer (modem) in the UE that the QoE measurements have been resumed, which triggers the RRC layer to either autonomously activate the suspended/paused associated radio measurements or inform the network of the resumed QoE measurements (e.g. confirming the instructed QoE measurement resumption), whereupon the network in turn may instruct the UE (e.g. using an RRCConnectionReconfiguration message or an RRCReconfiguration message) to resume the suspended/paused radio measurements associated with the resumed QoE measurements.

In another embodiment, pertaining to the case, where the UE can, autonomously or based on some preconfigured criteria, resume the QoE measurements, the UE also resumes the MDT and/or L2 measurements.

In examples in which successive requests arrive at the base station after the coordinated reporting of radio and QoE measurements has started, and before such coordinated reporting ends, e.g. a request from OAM or 5GC to alter the current radio related measurement configuration, different alternatives are possible for the network node, such as:

(a) queueing the incoming request for a given time or until e.g. the session is stopped and QoE measurements are terminated. The indication of the session stop may be derived e.g. from the reception of the feedback indication, indicating the stop of the ongoing session or the pertained QoE measurements from the application;

(b) rejecting the incoming attempt and responding to the requesting entity with a specific failure cause to indicate that there is a conflict with an ongoing procedure;

(c) stopping the ongoing coordinated reporting;

(d) in case multiple sessions are running, waiting for a feedback indication indicating that at least one of the sessions has stopped and then:

closing the current coordinated reporting which includes the session just terminated. e.g. requesting the UE to provide results up to the terminated session; and opening a new coordinated reporting which includes the remaining sessions and whose later results can be appended to the previous result for the still ongoing sessions (but not containing results for the session that has just terminated);

(e) dynamically reconfigure the ongoing coordinated reporting, e.g. modifying the radio related measurements configuration.

If the requested measurement reconfiguration received at the network node breaches the previous coordination of different measurement types, the network node may, in order to preserve the coordination, either modify the reconfiguration, or reconfigure the other ongoing measurements, not pertaining to the requested reconfiguration. For example, if the network node receives a request to alter the measurement period of one measurement type (e.g. MDT), and if this causes a misalignment, the network node may modify the corresponding QoE measurement period in order to preserve the alignment.

In an alternative solution the session feedback indication is used within the UE (RRC layer or lower layers) to start radio related measurements when there is a pending radio measurement configuration at UE (RRC layer or lower layers). When the RRC layer receives the session feedback indication from the application layer, it may use it as a trigger to start the radio measurements according to the radio measurement configuration.

Figure 12:
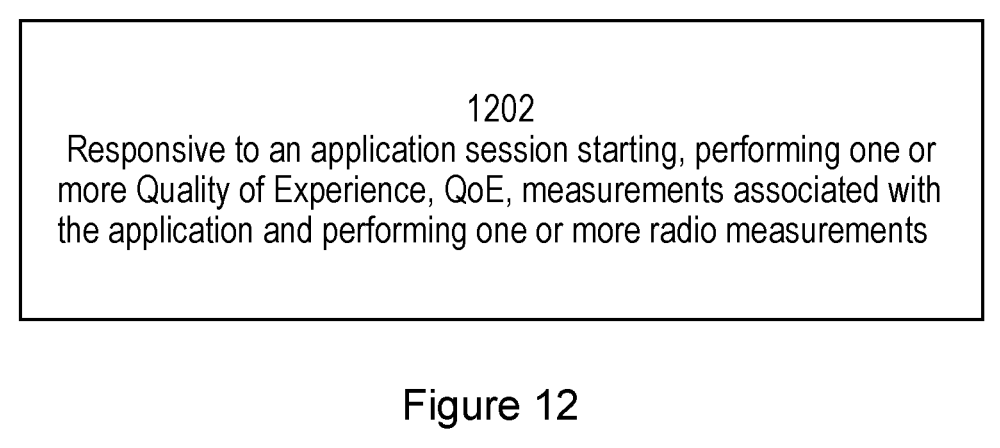

FIG. 12 illustrates a method in accordance with some embodiments. The method may be performed by a wireless device (or a UE).

FIG. 12 depicts a method in accordance with particular embodiments, the method begins at step 1202 with responsive to an application session starting, performing one or more Quality of Experience, QoE, measurements associated with the application and performing one or more radio measurements. The method may comprise performing the one or more radio measurements responsive to receiving an indication at a radio resource control layer form an application layer that the application session has started. The method may comprise receiving a radio measurement configuration from a base station, wherein the radio measurement configuration is indicated as being for use when an application session of an indicated service type starts. The measurement configuration may alternatively or additionally be indicated as being for use with a particular QoE reference ID or UE Request Session ID. The method may further comprise transmitting session feedback indication to a base station comprising results from the one or more QoE measurements and the one or more radio measurements.

FIG. 13 illustrates a method in accordance with some embodiments. The method may be performed by a base station.

FIG. 13 depicts a method in accordance with particular embodiments, the method begins at step 1302 with transmitting a radio measurement configuration to a wireless device, wherein the radio measurement configuration is indicated as being for use when an application session of an indicated service type starts, or an application session associated with a Session ID starts, or when QoE measurements start associated with a QoE reference ID.

Figure 14:
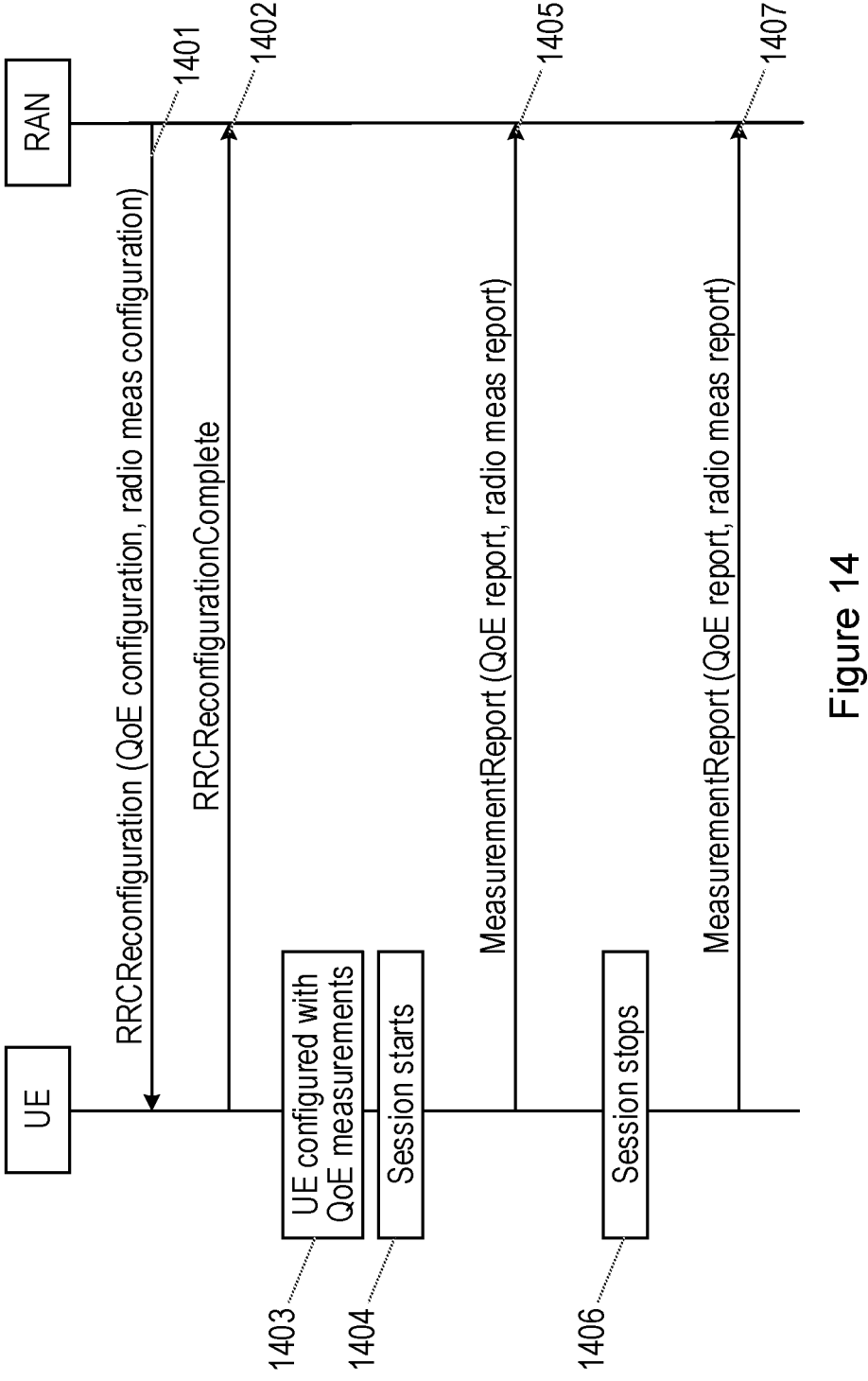
FIG. 14 illustrates an example of the methods of FIGS. 12 and 13 in more detail. In particular

FIG. 14 illustrates an example of the methods of FIGS. 12 and 13 in more details. In particular, FIG. 14 is a signaling diagram according to some embodiments.

In step 1401, the UE receives a configuration of QoE measurements (e.g. an RRCReconfiguration (QoE configuration, radio meas configuration) message). The UE also receives in this step a radio measurement configuration. The radio measurement configuration may be indicated as being for use when an application session of an indicated service type starts. The radio measurement configuration may therefore indicate at least one service type that the measurements should be performed if at least one of the indicated service types is running. Alternatively, the radio measurement configuration may be indicated as being for use with a QoE reference ID or a UE-Request Session ID. Step 1) may correspond to step 1302 of FIG. 13.

The radio measurement configuration may explicitly be indicated as pending measurement configuration (to be started when a session of the at least one service type starts), or it may be interpreted as a pending measurement when a service type is indicated in the radio measurement configuration. Note that if a session of at least one of the indicated service types is already ongoing when the UE receives the radio related measurement configuration, the UE may start to perform the radio related measurements in accordance with the received configuration immediately. As an alternative, the UE may ignore any session of the indicated service type(s) that is ongoing when the UE receives the radio related measurement configuration and regard the configuration as pending until a new session of the indicated service type(s) starts.

In step 1402, the UE acknowledges the measurement configurations received in step 1401. For example the UE may transmit an RRCReconfigurationComplete message to the network.

In step 1403, the UE is configured with a QoE measurement configuration and a radio measurement configuration (e.g. UE configured with QoE measurements).

In step 1404, an application session starts (e.g. session starts). The RRC layer receives an indication (session feedback indication including the service type) from the application layer that a session for the indicated service type has started and that QoE measurements have started.

The RRC layer uses the session feedback indication as a trigger to start performing radio related measurements. The configuration for the radio measurements have been received from the network at an earlier stage, together with the QoE configuration or in a separate RRCReconfiguration message. In an alternative solution the UE may start recording the radio related measurements in a file.

In step 1405, in some examples, the UE transmits intermittent report(s) to the network, e.g. MeasurementReport (Qoe report, radio measurement report), containing QoE measurements or radio measurements or both.

In step 1406, the RRC layer receives an indication (session feedback indication) from the application layer that a session for the indicated service type has stopped and that QoE measurements have stopped (e.g. session stops). The RRC layer uses the session feedback indication as a trigger to stop performing radio measurements or alternatively to stop collecting radio measurements in a file. This also applies to pausing the measurements, either as per request by the network or as per fulfilling some previously configured criteria for pausing the measurements. The resumption of measurements may be enabled, as described previously.

In step 1407, the RRC layer transmits a report, e.g. MeasurementReport (QoE report, radio measurement report), to the network, the message containing QoE measurements or radio measurements or both.

A radio related measurement configuration may be linked to one or more applications, service types, QoE reference IDs or UE-RequestSessionIDs with associated QoE measurement configurations. When more than one application/service is linked to a radio related measurement configuration, the radio related measurement configuration is active (and the UE performs the configured radio related measurements) when at least one of the applications/services is active (e.g. has an ongoing session).

In some embodiments, such linking may be more granular, such that not only applications/services are considered, but also components of an application, e.g. different media components (such as audio and video in a multimedia application). The feedback indication from the application layer in the UE would then be extended/refined to be able to indicate start and stop with finer granularity, e.g. on media component level, such that the application layer can indicate when individual media components, such as audio and video, are started or stopped. Different radio related measurement configurations may be activated by different media components.

In other embodiments, linking of a radio related measurement configuration to application(s)/service(s)/application component(s)/QoE measurement configuration(s) may be extended or generalized to comprise the possibility of a "wild card" linking (e.g. pertaining to QoE measurement configurations). A wild card linking may for instance mean that the concerned radio related measurement configuration would be activated when a first QoE measurement starts (of any type and pertaining to any application/service) and kept active as long as any QoE measurement session is ongoing.

In some embodiments, the radio related measurement configuration is activated (or provided) upon an indication that an associated/linked application or service (type) (or application/media component) has started. In other embodiments, the radio related measurement configuration is activated (or provided) upon an indication that a QoE measurement session associated with an associated/linked application or service (type) has started.

In other embodiments, the radio related measurement configuration is linked to one or more QoE measurement configurations (rather than to applications/service (types)). In an example of how this may be implemented in ASN.1 code, a measConfigAppLayerId (i.e. a unique identifier) is associated with a QoE measurement configuration. This identifier may be conveyed to the UE together with the IE that conveys the QoE measurement configuration to the UE. In the RRC specification for LTE (3GPP TS 36.331) this is the measConfigAppLayer IE, which also contains the measConfigAppLayerContainer, which contains the actual QoE measurement configuration. The measConfigAppLayer IE is in turn included in the OtherConfig IE, which is conveyed to the UE in the RRCConnectionReconfiguration message. A radio related measurement configuration may For example, MDT measurements in RRC_CONNECTED are reported continuously (periodically or triggered by configured events) as values in an RRC message MeasurementReport to the gNB. An analysis of both QoE measurements and radio related measurements together may be simpler if the formats were aligned.

Such alignment may be that the UE collects also radio related measurements in a file, e.g. in XML format, that is sent to the gNB. The file may comprise, for example: the radio measurement sample at a certain time, e.g. the RSRP value at that point in time, or PDCP delay for a given measurement interval; the time for the measurement sample; and/or the cell ID.

The session feedback indication could be used also as a trigger to start collecting radio related measurements in a file. When the UE receives, from the application layer, an indication that the session and the QoE measurements have started, it starts collecting radio related measurements in a file. The continuous measurements in MeasurementReport may or may not continue to be reported continuously in MeasurementReport during the time they are collected in a file, depending on network configuration.

When coordinated QoE and MDT measurement collections are desired, the QoE measurement collection may be ordered first. The MDT job request may comprise the identity of the QoE collection measurement job or vice versa.

An example for NR in the TraceJob information object class is illustrated below. The new parts that could be included in 3GPP TS 28.622 clause 4.3.30.2 are indicated below.

| Attribute Name | Support Qualifier | isReadable | isWritable | isInvariant | isNotifyable |
|---|---|---|---|---|---|
| [. . .] tjMDTQoEReference | [. . .] CM | [. . .] T | [. . .] T | [. . .] F | [. . .] T |

| Attribute constraints | |
|---|---|
| Name | Definition |
| [. . .] tjMDTQoEReference (support qualifier) | [. . .] This attribute shall be present only if the MDT TraceJob is connected to a QMCJob. | comprise of a measurement object (e.g. measObject-EUTRA) and a measurement report configuration (e.g. reportConfigEUTRA), linked together by an identifier referred to as a measurement ID (e.g. measId). A UE may be configured with multiple radio related measurement configurations using the MeasIdToAddModList IE, which contains a sequence of MeasIdToAddMod IEs. To link such a radio related measurement configuration to a QoE measurement configuration, the measConfigAppLayerId could be included in the MeasIdToAddMod IE, as in the example below.

```
MeasIdToAddModList::=SEQUENCE (SIZE (1 . . . max-
    NrofMeasId)) OF MeasIdToAddMod
MeasIdToAddMod::=SEQUENCE {
    measId MeasId,
    measObjectId MeasObjectId,
    reportConfigId ReportConfigId,
    measConfigApplayerId MeasConfigApplayerId
OPTIONAL
}
MeasConfigAppLayerId::=INTEGER (0 . . . 255)
```

The format of radio related measurements and QoE measurements are currently not the same. QoE measurements are collected and reported in an XML-file, which is sent to the gNB and forwarded to the Trace Collector Entity.

Example Implementation

A non-limiting example of including the service type, QoE reference IS or UE-RequestSessionID as part of measurement configuration to associate a measurement configuration to at least one specific service type can be captured as part of Report Config NR in RRC specification TS 38.331. The new parts that could be included in TS 38.331 are indicated below.

```
EventTriggerConfig::=SEQUENCE {
    serviceType-r17 ENUMERATED {goe, mbms, mtsi,
        ar/vr, urllc, iiot, . . . } OPTIONAL
    goe-Reference-r17 QoE-Reference-r17
        OPTIONAL
    ue-RequestSessionID UE-Request SessionID
        OPTIONAL
PeriodicalReportConfig:: =SEQUENCE {
    serviceType-r17 ENUMERATED {goe, mbms, mtsi,
        ar/vr, urllc, iiot, . . . } OPTIONAL
    goe-Reference-r17 QoE-Reference-r17
        OPTIONAL
    ue-RequestSessionID UE-Request SessionID
        OPTIONAL
```

---

EventTriggerConfig field descriptions

---

[ . . .]
serviceType
If this field is configured the measurement will be suspended in the UE until a session
related to the target service type is running in the application layer. If RRC layer in the
UE receives an indication that a session related to the target service has started, the
RRC layer in the UE will perform the configured measurement
[ . . .]

---

PeriodicalReportConfig field descriptions

---

[ . . .]
serviceType
If this field is configured the measurement will be suspended at UE until a session
related to the target service type is running at the application layer. If the UE RRC
receives an indication that a session related to the target service is running, the
UE RRC will perform the configured measurement

---

Optionally, the service Type-r17 ENUMERATED parameter included in the EventTriggerConfig and PeriodicalReportConfig IEs in the example above may be replaced by a list/sequence of parameters, e.g.:

serviceTypeList-r17 SEQUENCE (SIZE (1 . . . maxNrOfServiceType)) OF ServiceType-r17 OPTIONAL,
Where the ServiceType parameter could be defined as:
ServiceType-r17 ENUMERATED {qoe, mbms, mtsi, ar/vr, urllc, iiot, . . . }

Another variation of the example above could be to change the field description of the service Type parameter to:
serviceType If this field is configured the measurement will be suspended at UE until a QoE measurement session related to the target service type is running at the application layer. If the UE RRC receives an indication that a session related to the target service is running, the UE RRC will perform the configured measurement.

Figure 15:
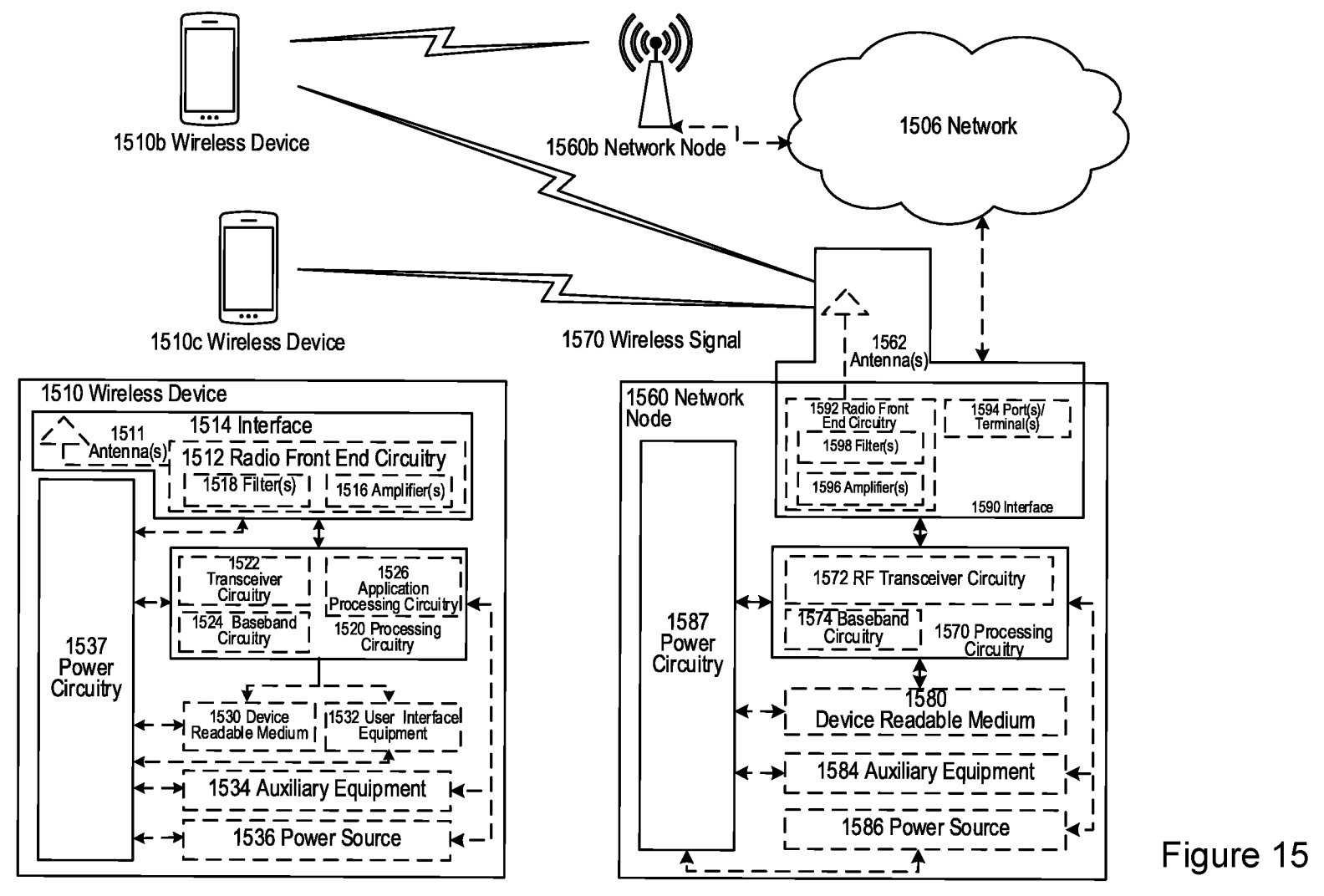

FIG. 15 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 15. For simplicity, the wireless network of FIG. 15 only depicts network 1506, network nodes 1560 and 1560*b*, and WDs 1510, 1510*b*, and 1510*c*. In practice, a wireless network may further include any additional elements suitable to support communication between wireless devices or between a wireless device and another communication device, such as a landline telephone, a service provider, or any other network node or end device. Of the illustrated components, network node 1560 and wireless device (WD) 1510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/ or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1560 and WD 1510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 15, network node 1560 includes processing circuitry 1570, device readable medium 1580, interface 1590, auxiliary equipment 1584, power source 1586, power circuitry 1587, and antenna 1562. Although network node 1560 illustrated in the example wireless network of FIG. 15 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1560 are depicted as single boxes located within a larger box, or nested within multiple boxes, in practice, a network node may comprise multiple different physical components that make up a single illustrated component (e.g., device readable medium 1580 may comprise multiple separate hard drives as well as multiple RAM modules).

Similarly, network node 1560 may be composed of multiple physically separate components (e.g., a NodeB component and a RNC component, or a BTS component and a BSC component, etc.), which may each have their own respective components. In certain scenarios in which network node 1560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1560 may be configured to support multiple radio access technologies (RATs). In such embodiments, some components may be duplicated (e.g., separate device readable medium 1580 for the different RATs) and some components may be reused (e.g., the same antenna 1562 may be shared by the RATs). Network node 1560 may also include multiple sets of the various illustrated components for different wireless technologies integrated into network node 1560, such as, for example, GSM, WCDMA, LTE, NR, WiFi, or Bluetooth wireless technologies. These wireless technologies may be integrated into the same or different chip or set of chips and other components within network node 1560.

Processing circuitry 1570 is configured to perform any determining, calculating, or similar operations (e.g., certain obtaining operations) described herein as being provided by a network node. These operations performed by processing circuitry 1570 may include processing information obtained by processing circuitry 1570 by, for example, converting the obtained information into other information, comparing the obtained information or converted information to information stored in the network node, and/or performing one or more operations based on the obtained information or converted information, and as a result of said processing making a determination.

Processing circuitry 1570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1560 components, such as device readable medium 1580, network node 1560 functionality. For example, processing circuitry 1570 may execute instructions stored in device readable medium 1580 or in memory within processing circuitry 1570. Such functionality may include providing any of the various wireless features, functions, or benefits discussed herein. In some embodiments, processing circuitry 1570 may include a system on a chip (SOC).

In some embodiments, processing circuitry 1570 may include one or more of radio frequency (RF) transceiver circuitry 1572 and baseband processing circuitry 1574. In some embodiments, radio frequency (RF) transceiver circuitry 1572 and baseband processing circuitry 1574 may be on separate chips (or sets of chips), boards, or units, such as radio units and digital units. In alternative embodiments, part or all of RF transceiver circuitry 1572 and baseband processing circuitry 1574 may be on the same chip or set of chips, boards, or units In certain embodiments, some or all of the functionality described herein as being provided by a network node, base station, eNB or other such network device may be performed by processing circuitry 1570 executing instructions stored on device readable medium 1580 or memory within processing circuitry 1570. In alternative embodiments, some or all of the functionality may be provided by processing circuitry 1570 without executing instructions stored on a separate or discrete device readable medium, such as in a hard-wired manner. In any of those embodiments, whether executing instructions stored on a device readable storage medium or not, processing circuitry 1570 can be configured to perform the described functionality. The benefits provided by such functionality are not limited to processing circuitry 1570 alone or to other components of network node 1560, but are enjoyed by network node 1560 as a whole, and/or by end users and the wireless network generally.

Device readable medium 1580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1570. Device readable medium 1580 may store any suitable instructions, data or information, including a computer program, software, an application including one or more of logic, rules, code, tables, etc. and/or other instructions capable of being executed by processing circuitry 1570 and, utilized by network node 1560. Device readable medium 1580 may be used to store any calculations made by processing circuitry 1570 and/or any data received via interface 1590. In some embodiments, processing circuitry 1570 and device readable medium 1580 may be considered to be integrated.

Interface 1590 is used in the wired or wireless communication of signalling and/or data between network node 1560, network 1506, and/or WDs 1510. As illustrated, interface 1590 comprises port(s)/terminal(s) 1594 to send and receive data, for example to and from network 1506 over a wired connection. Interface 1590 also includes radio front end circuitry 1592 that may be coupled to, or in certain embodiments a part of, antenna 1562. Radio front end circuitry 1592 comprises filters 1598 and amplifiers 1596. Radio front end circuitry 1592 may be connected to antenna 1562 and processing circuitry 1570. Radio front end circuitry may be configured to condition signals communicated between antenna 1562 and processing circuitry 1570. Radio front end circuitry 1592 may receive digital data that is to be sent out to other network nodes or WDs via a wireless connection. Radio front end circuitry 1592 may convert the digital data into a radio signal having the appropriate channel and bandwidth parameters using a combination of filters 1598 and/or amplifiers 1596. The radio signal may then be transmitted via antenna 1562. Similarly, when receiving data, antenna 1562 may collect radio signals which are then converted into digital data by radio front end circuitry 1592. The digital data may be passed to processing circuitry 1570. In other embodiments, the interface may comprise different components and/or different combinations of components.

In certain alternative embodiments, network node 1560 may not include separate radio front end circuitry 1592, instead, processing circuitry 1570 may comprise radio front end circuitry and may be connected to antenna 1562 without separate radio front end circuitry 1592. Similarly, in some embodiments, all or some of RF transceiver circuitry 1572 may be considered a part of interface 1590. In still other embodiments, interface 1590 may include one or more ports or terminals 1594, radio front end circuitry 1592, and RF transceiver circuitry 1572, as part of a radio unit (not shown), and interface 1590 may communicate with baseband processing circuitry 1574, which is part of a digital unit (not shown).

Antenna 1562 may include one or more antennas, or antenna arrays, configured to send and/or receive wireless signals. Antenna 1562 may be coupled to radio front end circuitry 1590 and may be any type of antenna capable of transmitting and receiving data and/or signals wirelessly. In some embodiments, antenna 1562 may comprise one or more omni-directional, sector or panel antennas operable to transmit/receive radio signals between, for example, 2 GHZ and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1562 may be separate from network node 1560 and may be connectable to network node 1560 through an interface or port.

Antenna 1562, interface 1590, and/or processing circuitry 1570 may be configured to perform any receiving operations and/or certain obtaining operations described herein as being performed by a network node. Any information, data and/or signals may be received from a wireless device, another network node and/or any other network equipment. Similarly, antenna 1562, interface 1590, and/or processing circuitry 1570 may be configured to perform any transmitting operations described herein as being performed by a network node. Any information, data and/or signals may be transmitted to a wireless device, another network node and/or any other network equipment.

Power circuitry 1587 may comprise, or be coupled to, power management circuitry and is configured to supply the components of network node 1560 with power for performing the functionality described herein. Power circuitry 1587 may receive power from power source 1586. Power source 1586 and/or power circuitry 1587 may be configured to provide power to the various components of network node 1560 in a form suitable for the respective components (e.g., at a voltage and current level needed for each respective component). Power source 1586 may either be included in, or external to, power circuitry 1587 and/or network node 1560. For example, network node 1560 may be connectable to an external power source (e.g., an electricity outlet) via an input circuitry or interface such as an electrical cable, whereby the external power source supplies power to power circuitry 1587. As a further example, power source 1586 may comprise a source of power in the form of a battery or battery pack which is connected to, or integrated in, power circuitry 1587. The battery may provide backup power should the external power source fail. Other types of power sources, such as photovoltaic devices, may also be used.

Alternative embodiments of network node 1560 may include additional components beyond those shown in FIG. 15 that may be responsible for providing certain aspects of the network node's functionality, including any of the functionality described herein and/or any functionality necessary to support the subject matter described herein. For example, network node 1560 may include user interface equipment to allow input of information into network node 1560 and to allow output of information from network node 1560. This may allow a user to perform diagnostic, maintenance, repair, and other administrative functions for network node 1560.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc., A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1510 includes antenna 1511, interface 1514, processing circuitry 1520, device readable medium 1530, user interface equipment 1532, auxiliary equipment 1534, power source 1536 and power circuitry 1537. WD 1510 may include multiple sets of one or more of the illustrated components for different wireless technologies supported by WD 1510, such as, for example, GSM, WCDMA, LTE, NR, WiFi, WiMAX, or Bluetooth wireless technologies, just to mention a few. These wireless technologies may be integrated into the same or different chips or set of chips as other components within WD 1510.

Antenna 1511 may include one or more antennas or antenna arrays, configured to send and/or receive wireless signals, and is connected to interface 1514. In certain alternative embodiments, antenna 1511 may be separate from WD 1510 and be connectable to WD 1510 through an interface or port. Antenna 1511, interface 1514, and/or processing circuitry 1520 may be configured to perform any receiving or transmitting operations described herein as being performed by a WD. Any information, data and/or signals may be received from a network node and/or another WD. In some embodiments, radio front end circuitry and/or antenna 1511 may be considered an interface.

As illustrated, interface 1514 comprises radio front end circuitry 1512 and antenna 1511. Radio front end circuitry 1512 comprise one or more filters 1518 and amplifiers 1516. Radio front end circuitry 1514 is connected to antenna 1511 and processing circuitry 1520, and is configured to condition signals communicated between antenna 1511 and processing circuitry 1520. Radio front end circuitry 1512 may be coupled to or a part of antenna 1511. In some embodiments, WD 1510 may not include separate radio front end circuitry 1512; rather, processing circuitry 1520 may comprise radio front end circuitry and may be connected to antenna 1511. Similarly, in some embodiments, some or all of RF transceiver circuitry 1522 may be considered a part of interface 1514. Radio front end circuitry 1512 may receive digital data that is to be sent out to other network nodes or WDs via a wireless connection. Radio front end circuitry 1512 may convert the digital data into a radio signal having the appropriate channel and bandwidth parameters using a combination of filters 1518 and/or amplifiers 1516. The radio signal may then be transmitted via antenna 1511. Similarly, when receiving data, antenna 1511 may collect radio signals which are then converted into digital data by radio front end circuitry 1512. The digital data may be passed to processing circuitry 1520. In other embodiments, the interface may comprise different components and/or different combinations of components.

Processing circuitry 1520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1510 components, such as device readable medium 1530, WD 1510 functionality. Such functionality may include providing any of the various wireless features or benefits discussed herein. For example, processing circuitry 1520 may execute instructions stored in device readable medium 1530 or in memory within processing circuitry 1520 to provide the functionality disclosed herein.

As illustrated, processing circuitry 1520 includes one or more of RF transceiver circuitry 1522, baseband processing circuitry 1524, and application processing circuitry 1526. In other embodiments, the processing circuitry may comprise different components and/or different combinations of components. In certain embodiments processing circuitry 1520 of WD 1510 may comprise a SOC. In some embodiments, RF transceiver circuitry 1522, baseband processing circuitry 1524, and application processing circuitry 1526 may be on separate chips or sets of chips. In alternative embodiments, part or all of baseband processing circuitry 1524 and application processing circuitry 1526 may be combined into one chip or set of chips, and RF transceiver circuitry 1522 may be on a separate chip or set of chips. In still alternative embodiments, part or all of RF transceiver circuitry 1522 and baseband processing circuitry 1524 may be on the same chip or set of chips, and application processing circuitry 1526 may be on a separate chip or set of chips. In yet other alternative embodiments, part or all of RF transceiver circuitry 1522, baseband processing circuitry 1524, and application processing circuitry 1526 may be combined in the same chip or set of chips. In some embodiments, RF transceiver circuitry 1522 may be a part of interface 1514. RF transceiver circuitry 1522 may condition RF signals for processing circuitry 1520.

In certain embodiments, some or all of the functionality described herein as being performed by a WD may be provided by processing circuitry 1520 executing instructions stored on device readable medium 1530, which in certain embodiments may be a computer-readable storage medium. In alternative embodiments, some or all of the functionality may be provided by processing circuitry 1520 without executing instructions stored on a separate or discrete device readable storage medium, such as in a hard-wired manner. In any of those particular embodiments, whether executing instructions stored on a device readable storage medium or not, processing circuitry 1520 can be configured to perform the described functionality. The benefits provided by such functionality are not limited to processing circuitry 1520 alone or to other components of WD 1510, but are enjoyed by WD 1510 as a whole, and/or by end users and the wireless network generally.

Processing circuitry 1520 may be configured to perform any determining, calculating, or similar operations (e.g., certain obtaining operations) described herein as being performed by a WD. These operations, as performed by processing circuitry 1520, may include processing information obtained by processing circuitry 1520 by, for example, converting the obtained information into other information, comparing the obtained information or converted information to information stored by WD 1510, and/or performing one or more operations based on the obtained information or converted information, and as a result of said processing making a determination.

Device readable medium 1530 may be operable to store a computer program, software, an application including one or more of logic, rules, code, tables, etc. and/or other instructions capable of being executed by processing circuitry 1520. Device readable medium 1530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1520. In some embodiments, processing circuitry 1520 and device readable medium 1530 may be considered to be integrated.

User interface equipment 1532 may provide components that allow for a human user to interact with WD 1510. Such interaction may be of many forms, such as visual, audial, tactile, etc. User interface equipment 1532 may be operable to produce output to the user and to allow the user to provide input to WD 1510. The type of interaction may vary depending on the type of user interface equipment 1532 installed in WD 1510. For example, if WD 1510 is a smart phone, the interaction may be via a touch screen; if WD 1510 is a smart meter, the interaction may be through a screen that provides usage (e.g., the number of gallons used) or a speaker that provides an audible alert (e.g., if smoke is detected). User interface equipment 1532 may include input interfaces, devices and circuits, and output interfaces, devices and circuits. User interface equipment 1532 is configured to allow input of information into WD 1510, and is connected to processing circuitry 1520 to allow processing circuitry 1520 to process the input information. User interface equipment 1532 may include, for example, a microphone, a proximity or other sensor, keys/buttons, a touch display, one or more cameras, a USB port, or other input circuitry. User interface equipment 1532 is also configured to allow output of information from WD 1510, and to allow processing circuitry 1520 to output information from WD 1510. User interface equipment 1532 may include, for example, a speaker, a display, vibrating circuitry, a USB port, a headphone interface, or other output circuitry. Using one or more input and output interfaces, devices, and circuits, of user interface equipment 1532, WD 1510 may communicate with end users and/or the wireless network, and allow them to benefit from the functionality described herein.

Auxiliary equipment 1534 is operable to provide more specific functionality which may not be generally performed by WDs. This may comprise specialized sensors for doing measurements for various purposes, interfaces for additional types of communication such as wired communications etc. The inclusion and type of components of auxiliary equipment 1534 may vary depending on the embodiment and/or scenario.

Power source 1536 may, in some embodiments, be in the form of a battery or battery pack. Other types of power sources, such as an external power source (e.g., an electricity outlet), photovoltaic devices or power cells, may also be used. WD 1510 may further comprise power circuitry 1537 for delivering power from power source 1536 to the various parts of WD 1510 which need power from power source 1536 to carry out any functionality described or indicated herein. Power circuitry 1537 may in certain embodiments comprise power management circuitry. Power circuitry 1537 may additionally or alternatively be operable to receive power from an external power source; in which case WD. 1510 may be connectable to the external power source (such as an electricity outlet) via input circuitry or an interface such as an electrical power cable. Power circuitry 1537 may also in certain embodiments be operable to deliver power from an external power source to power source 1536. This may be, for example, for the charging of power source 1536. Power circuitry 1537 may perform any formatting, converting, or other modification to the power from power source 1536 to make the power suitable for the respective components of WD 1510 to which power is supplied.

Figure 16:
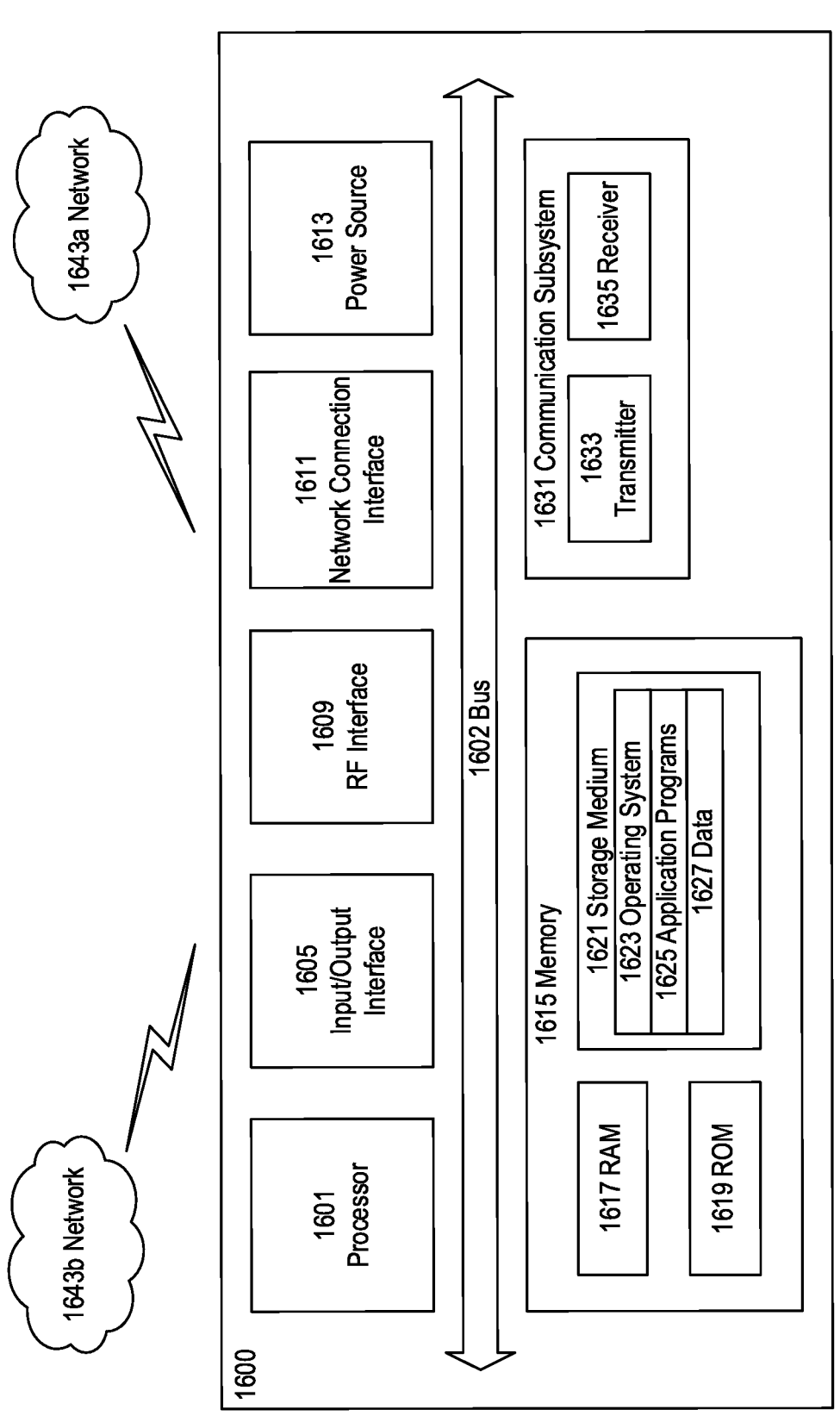
FIG. 16 illustrates a User Equipment in accordance with some embodiments.

FIG. 16 illustrates a User Equipment in accordance with some embodiments

FIG. 16 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1600 may be any UE identified by the $3^{rd}$ Generation Partnership Project (3GPP), including a NB-IoT UE, a machine type communication (MTC) UE, and/or an enhanced MTC (eMTC) UE. UE 1600, as illustrated in FIG. 16, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 16 is a UE, the components discussed herein are equally applicable to a WD, and vice-versa.

In FIG. 16, UE 1600 includes processing circuitry 1601 that is operatively coupled to input/output interface 1605, radio frequency (RF) interface 1609, network connection interface 1611, memory 1615 including random access memory (RAM) 1617, read-only memory (ROM) 1619, and storage medium 1621 or the like, communication subsystem 1631, power source 1633, and/or any other component, or any combination thereof. Storage medium 1621 includes operating system 1623, application program 1625, and data 1627. In other embodiments, storage medium 1621 may include other similar types of information. Certain UEs may utilize all of the components shown in FIG. 16, or only a subset of the components. The level of integration between the components may vary from one UE to another UE. Further, certain UEs may contain multiple instances of a component, such as multiple processors, memories, transceivers, transmitters, receivers, etc.

In FIG. 16, processing circuitry 1601 may be configured to process computer instructions and data. Processing circuitry 1601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1601 may include two central processing units (CPUs). Data may be information in a form suitable for use by a computer.

In the depicted embodiment, input/output interface 1605 may be configured to provide a communication interface to an input device, output device, or input and output device. UE 1600 may be configured to use an output device via input/output interface 1605. An output device may use the same type of interface port as an input device. For example, a USB port may be used to provide input to and output from UE 1600. The output device may be a speaker, a sound card, a video card, a display, a monitor, a printer, an actuator, an emitter, a smartcard, another output device, or any combination thereof. UE 1600 may be configured to use an input device via input/output interface 1605 to allow a user to capture information into UE 1600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 16, RF interface 1609 may be configured to provide a communication interface to RF components such as a transmitter, a receiver, and an antenna. Network connection interface 1611 may be configured to provide a communication interface to network 1643*a*. Network 1643*a* may encompass wired and/or wireless networks such as a local-area network (LAN), a wide-area network (WAN), a computer network, a wireless network, a telecommunications network, another like network or any combination thereof. For example, network 1643*a* may comprise a Wi-Fi network. Network connection interface 1611 may be configured to include a receiver and a transmitter interface used to communicate with one or more other devices over a communication network according to one or more communication protocols, such as Ethernet, TCP/IP, SONET, ATM, or the like. Network connection interface 1611 may implement receiver and transmitter functionality appropriate to the communication network links (e.g., optical, electrical, and the like). The transmitter and receiver functions may share circuit components, software or firmware, or alternatively may be implemented separately.

RAM 1617 may be configured to interface via bus 1602 to processing circuitry 1601 to provide storage or caching of data or computer instructions during the execution of software programs such as the operating system, application programs, and device drivers. ROM 1619 may be configured to provide computer instructions or data to processing circuitry 1601. For example, ROM 1619 may be configured to store invariant low-level system code or data for basic system functions such as basic input and output (I/O), startup, or reception of keystrokes from a keyboard that are stored in a non-volatile memory. Storage medium 1621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1621 may be configured to include operating system 1623, application program 1625 such as a web browser application, a widget or gadget engine or another application, and data file 1627. Storage medium 1621 may store, for use by UE 1600, any of a variety of various operating systems or combinations of operating systems.

Storage medium 1621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1621 may allow UE 1600 to access computer-executable instructions, application programs or the like, stored on transitory or non-transitory memory media, to off-load data, or to upload data. An article of manufacture, such as one utilizing a communication system may be tangibly embodied in storage medium 1621, which may comprise a device readable medium.

In FIG. 16, processing circuitry 1601 may be configured to communicate with network 1643*b* using communication subsystem 1631. Network 1643*a* and network 1643*b* may be the same network or networks or different network or networks. Communication subsystem 1631 may be configured to include one or more transceivers used to communicate with network 1643*b*. For example, communication subsystem 1631 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1633 and/or receiver 1635 to implement transmitter or receiver functionality, respectively, appropriate to the RAN links (e.g., frequency allocations and the like). Further, transmitter 1633 and receiver 1635 of each transceiver may share circuit components, software or firmware, or alternatively may be implemented separately.

In the illustrated embodiment, the communication functions of communication subsystem 1631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1631 may include cellular communication, Wi-Fi communication, Bluetooth communication, and GPS communication. Network 1643*b* may encompass wired and/or wireless networks such as a local-area network (LAN), a wide-area network (WAN), a computer network, a wireless network, a telecommunications network, another like network or any combination thereof. For example, network 1643*b* may be a cellular network, a Wi-Fi network, and/or a near-field network. Power source 1613 may be configured to provide alternating current (AC) or direct current (DC) power to components of UE 1600.

The features, benefits and/or functions described herein may be implemented in one of the components of UE 1600 or partitioned across multiple components of UE 1600. Further, the features, benefits, and/or functions described herein may be implemented in any combination of hardware, software or firmware. In one example, communication subsystem 1631 may be configured to include any of the components described herein. Further, processing circuitry 1601 may be configured to communicate with any of such components over bus 1602. In another example, any of such components may be represented by program instructions stored in memory that when executed by processing circuitry 1601 perform the corresponding functions described herein. In another example, the functionality of any of such components may be partitioned between processing circuitry 1601 and communication subsystem 1631. In another example, the non-computationally intensive functions of any of such components may be implemented in software or firmware and the computationally intensive functions may be implemented in hardware.

Figure 17:
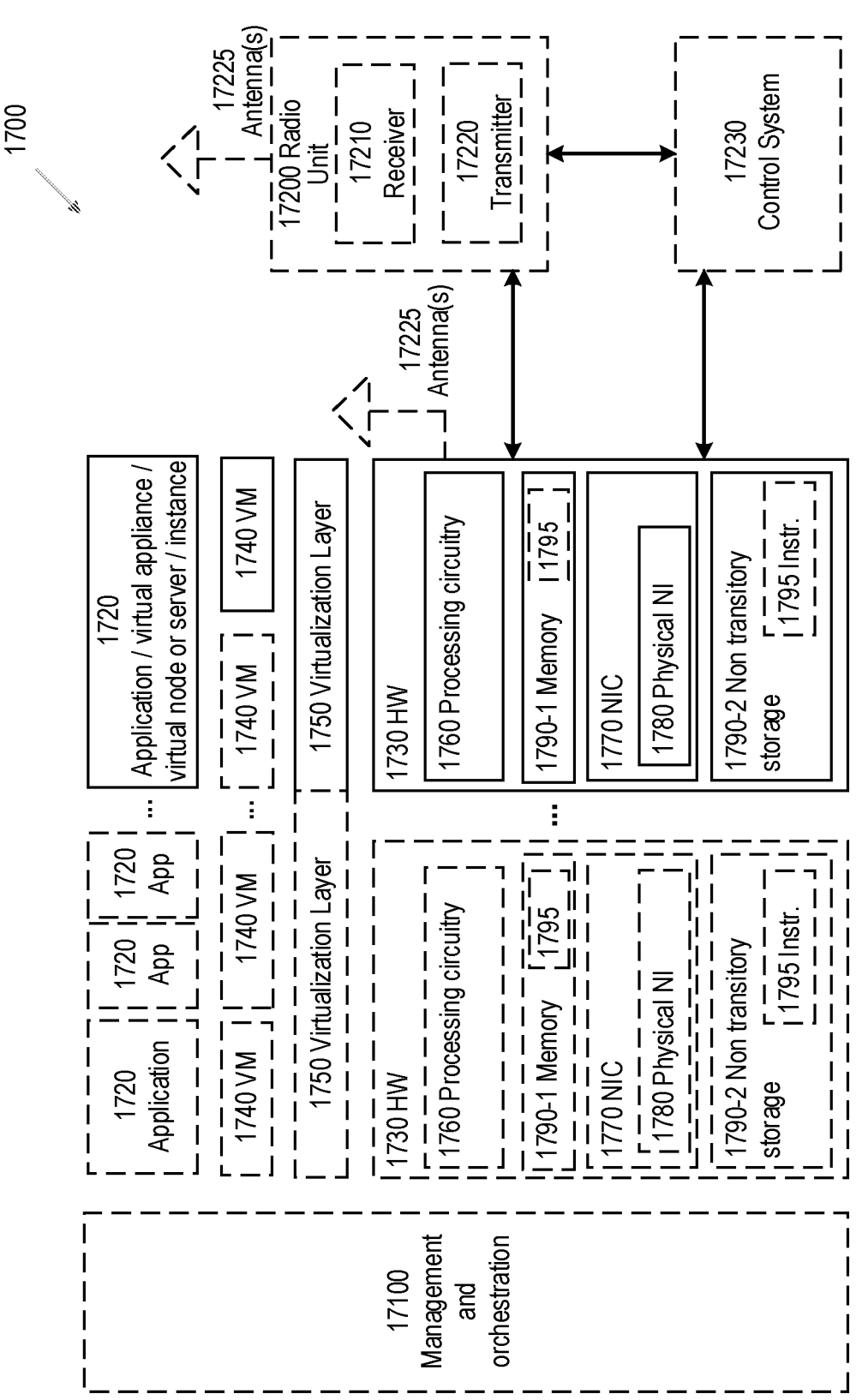
FIG. 17 illustrates a virtualization environment in accordance with some embodiments.

FIG. 17 illustrates a virtualization environment in accordance with some embodiments.

FIG. 17 is a schematic block diagram illustrating a virtualization environment 1700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1700 hosted by one or more of hardware nodes 1730. Further, in embodiments in which the virtual node is not a radio access node or does not require radio connectivity (e.g., a core network node), then the network node may be entirely virtualized.

The functions may be implemented by one or more applications 1720 (which may alternatively be called software instances, virtual appliances, network functions, virtual nodes, virtual network functions, etc.) operative to implement some of the features, functions, and/or benefits of some of the embodiments disclosed herein. Applications 1720 are run in virtualization environment 1700 which provides hardware 1730 comprising processing circuitry 1760 and memory 1790. Memory 1790 contains instructions 1795 executable by processing circuitry 1760 whereby application 1720 is operative to provide one or more of the features, benefits, and/or functions disclosed herein.

Virtualization environment 1700, comprises general-purpose or special-purpose network hardware devices 1730 comprising a set of one or more processors or processing circuitry 1760, which may be commercial off-the-shelf (COTS) processors, dedicated Application Specific Integrated Circuits (ASICs), or any other type of processing circuitry including digital or analog hardware components or special purpose processors. Each hardware device may comprise memory 1790-1 which may be non-persistent memory for temporarily storing instructions 1795 or software executed by processing circuitry 1760. Each hardware device may comprise one or more network interface controllers (NICs) 1770, also known as network interface cards, which include physical network interface 1780. Each hardware device may also include non-transitory, persistent, machine-readable storage media 1790-2 having stored therein software 1795 and/or instructions executable by processing circuitry 1760. Software 1795 may include any type of software including software for instantiating one or more virtualization layers 1750 (also referred to as hypervisors), software to execute virtual machines 1740 as well as software allowing it to execute functions, features and/or benefits described in relation with some embodiments described herein.

Virtual machines 1740, comprise virtual processing, virtual memory, virtual networking or interface and virtual storage, and may be run by a corresponding virtualization layer 1750 or hypervisor. Different embodiments of the instance of virtual appliance 1720 may be implemented on one or more of virtual machines 1740, and the implementations may be made in different ways.

During operation, processing circuitry 1760 executes software 1795 to instantiate the hypervisor or virtualization layer 1750, which may sometimes be referred to as a virtual machine monitor (VMM). Virtualization layer 1750 may present a virtual operating platform that appears like networking hardware to virtual machine 1740.

As shown in FIG. 17, hardware 1730 may be a standalone network node with generic or specific components. Hardware 1730 may comprise antenna 17225 and may implement some functions via virtualization. Alternatively, hardware 1730 may be part of a larger cluster of hardware (e.g. such as in a data center or customer premise equipment (CPE) where many hardware nodes work together and are managed via management and orchestration (MANO) 17100, which, among others, oversees lifecycle management of applications 1720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1740 may be a software implementation of a physical machine that runs programs as if they were executing on a physical, non-virtualized machine. Each of virtual machines 1740, and that part of hardware 1730 that executes that virtual machine, be it hardware dedicated to that virtual machine and/or hardware shared by that virtual machine with others of the virtual machines 1740, forms a separate virtual network elements (VNE).

Still in the context of NFV, Virtual Network Function (VNF) is responsible for handling specific network functions that run in one or more virtual machines 1740 on top of hardware networking infrastructure 1730 and corresponds to application 1720 in FIG. 17.

In some embodiments, one or more radio units 17200 that each include one or more transmitters 17220 and one or more receivers 17210 may be coupled to one or more antennas 17225. Radio units 17200 may communicate directly with hardware nodes 1730 via one or more appropriate network interfaces and may be used in combination with the virtual components to provide a virtual node with radio capabilities, such as a radio access node or a base station.

In some embodiments, some signalling can be effected with the use of control system 17230 which may alternatively be used for communication between the hardware nodes 1730 and radio units 17200.

Figure 18:
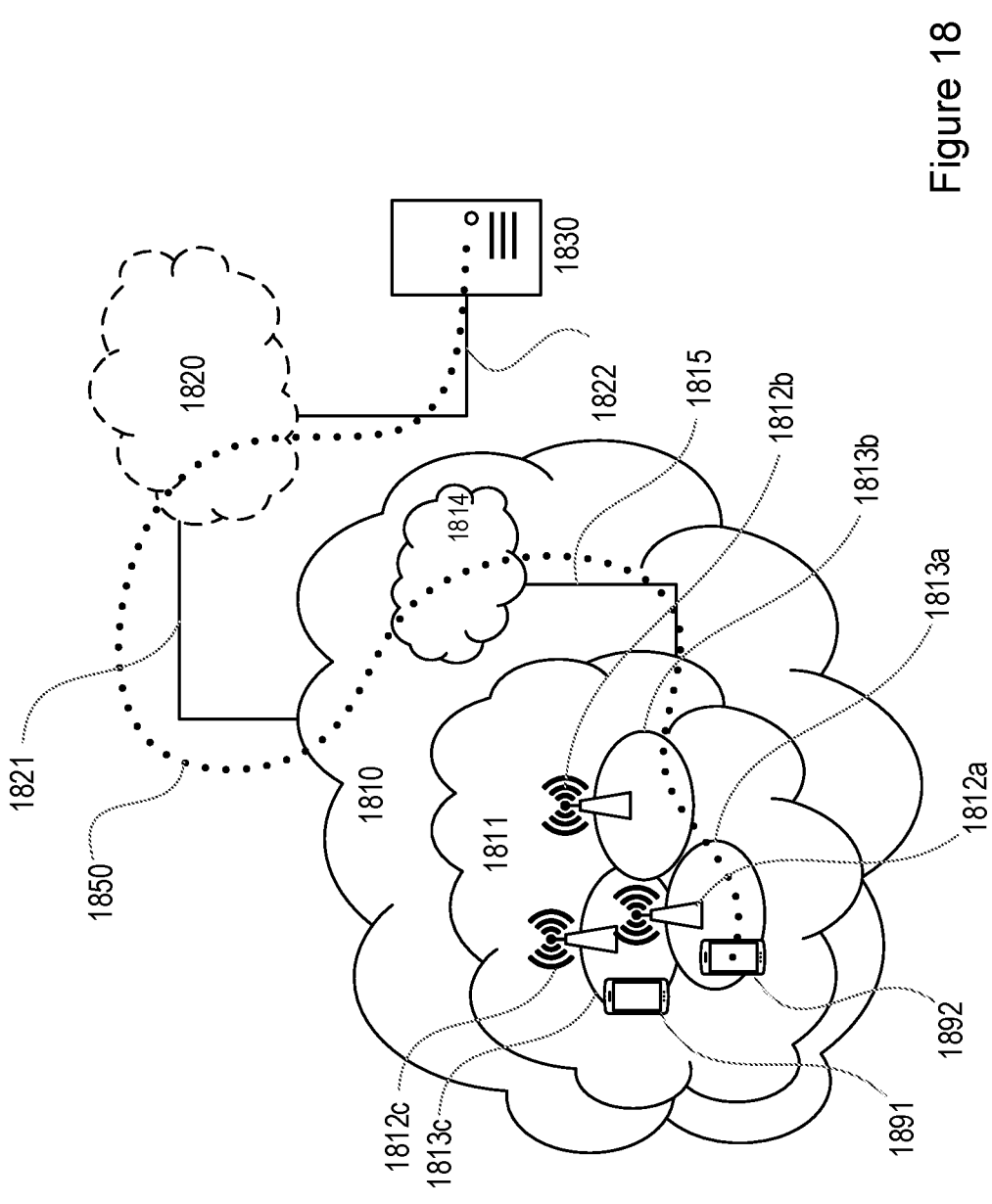
FIG. 18 illustrates a telecommunication network connected via an intermediate network to a host computer in accordance with some embodiments.

FIG. 18 illustrates a telecommunication network connected via an intermediate network to a host computer in accordance with some embodiments.

With reference to FIG. 18, in accordance with an embodiment, a communication system includes telecommunication network 1810, such as a 3GPP-type cellular network, which comprises access network 1811, such as a radio access network, and core network 1814. Access network 1811 comprises a plurality of base stations 1812*a*, 1812*b*, 1812*c*, such as NBs, eNBs, gNBs or other types of wireless access points, each defining a corresponding coverage area 1813*a*, 1813*b*, 1813*c*. Each base station 1812*a*, 1812*b*, 1812*c* is connectable to core network 1814 over a wired or wireless connection 1815. A first UE 1891 located in coverage area 1813*c* is configured to wirelessly connect to, or be paged by, the corresponding base station 1812*c*. A second UE 1892 in coverage area 1813*a* is wirelessly connectable to the corresponding base station 1812*a*. While a plurality of UEs 1891, 1892 are illustrated in this example, the disclosed embodiments are equally applicable to a situation where a sole UE is in the coverage area or where a sole UE is connecting to the corresponding base station 1812.

Telecommunication network 1810 is itself connected to host computer 1830, which may be embodied in the hardware and/or software of a standalone server, a cloud-implemented server, a distributed server or as processing resources in a server farm. Host computer 1830 may be under the ownership or control of a service provider, or may be operated by the service provider or on behalf of the service provider. Connections 1821 and 1822 between telecommunication network 1810 and host computer 1830 may extend directly from core network 1814 to host computer 1830 or may go via an optional intermediate network 1820. Intermediate network 1820 may be one of, or a combination of more than one of, a public, private or hosted network; intermediate network 1820, if any, may be a backbone network or the Internet; in particular, intermediate network 1820 may comprise two or more sub-networks (not shown).

The communication system of FIG. 18 as a whole enables connectivity between the connected UEs 1891, 1892 and host computer 1830. The connectivity may be described as an over-the-top (OTT) connection 1850. Host computer 1830 and the connected UEs 1891, 1892 are configured to communicate data and/or signaling via OTT connection 1850, using access network 1811, core network 1814, any intermediate network 1820 and possible further infrastructure (not shown) as intermediaries. OTT connection 1850 may be transparent in the sense that the participating communication devices through which OTT connection 1850 passes are unaware of routing of uplink and downlink communications. For example, base station 1812 may not or need not be informed about the past routing of an incoming downlink communication with data originating from host computer 1830 to be forwarded (e.g., handed over) to a connected UE 1891. Similarly, base station 1812 need not be aware of the future routing of an outgoing uplink communication originating from the UE 1891 towards the host computer 1830.

Figure 19:
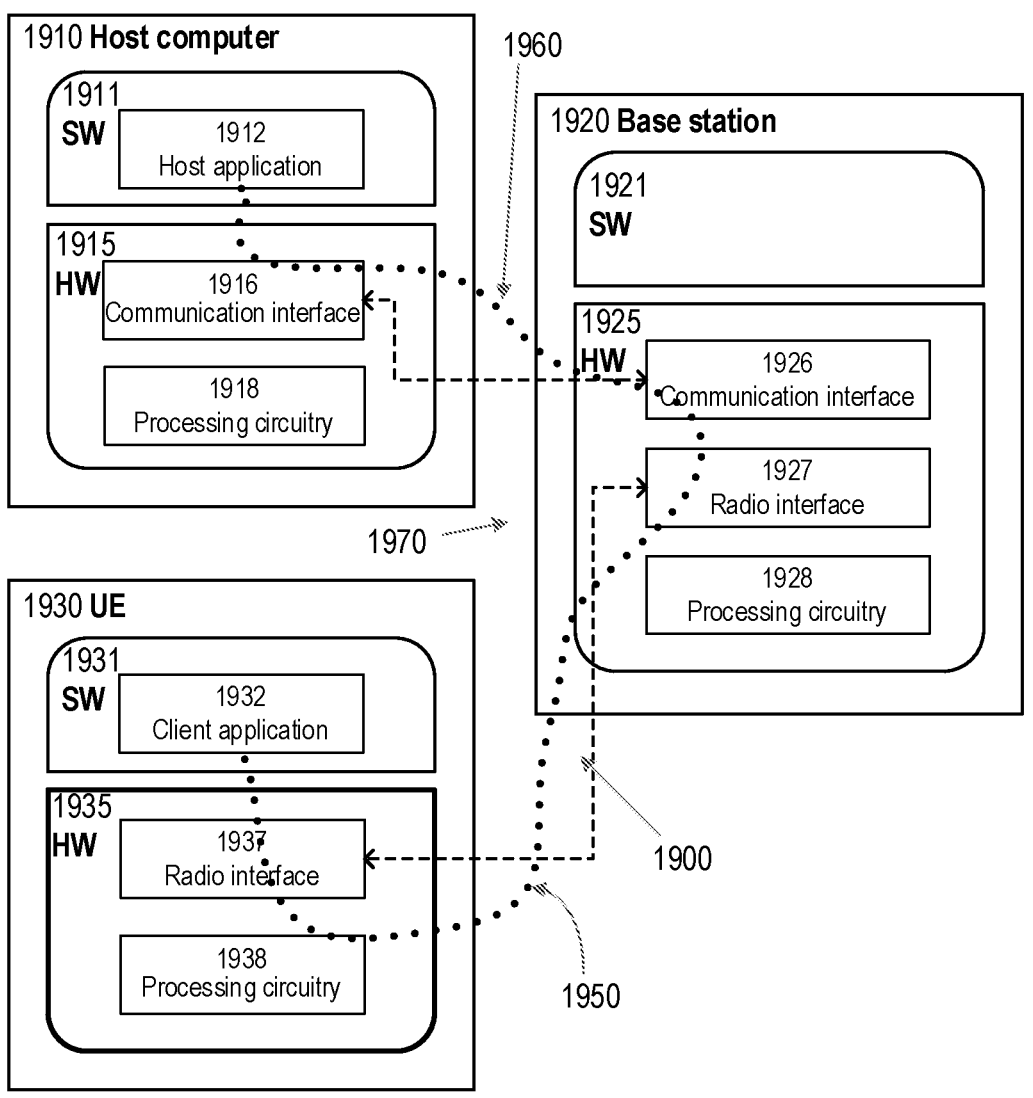
FIG. 19 illustrates a host computer communicating via a base station with a user equipment over a partially wireless connection in accordance with some embodiments.

FIG. 19 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 19. In communication system 1900, host computer 1910 comprises hardware 1915 including communication interface 1916 configured to set up and maintain a wired or wireless connection with an interface of a different communication device of communication system 1900. Host computer 1910 further comprises processing circuitry 1918, which may have storage and/or processing capabilities. In particular, processing circuitry 1918 may comprise one or more programmable processors, application-specific integrated circuits, field programmable gate arrays or combinations of these (not shown) adapted to execute instructions. Host computer 1910 further comprises software 1911, which is stored in or accessible by host computer 1910 and executable by processing circuitry 1918. Software 1911 includes host application 1912. Host application 1912 may be operable to provide a service to a remote user, such as UE 1930 connecting via OTT connection 1950 terminating at UE 1930 and host computer 1910. In providing the service to the remote user, host application 1912 may provide user data which is transmitted using OTT connection 1950.

Communication system 1900 further includes base station 1920 provided in a telecommunication system and comprising hardware 1925 enabling it to communicate with host computer 1910 and with UE 1930. Hardware 1925 may include communication interface 1926 for setting up and maintaining a wired or wireless connection with an interface of a different communication device of communication system 1900, as well as radio interface 1927 for setting up and maintaining at least wireless connection 1970 with UE 1930 located in a coverage area (not shown in FIG. 19) served by base station 1920. Communication interface 1926 may be configured to facilitate connection 1960 to host computer 1910. Connection 1960 may be direct or it may pass through a core network (not shown in FIG. 19) of the telecommunication system and/or through one or more intermediate networks outside the telecommunication system. In the embodiment shown, hardware 1925 of base station 1920 further includes processing circuitry 1928, which may comprise one or more programmable processors, application-specific integrated circuits, field programmable gate arrays or combinations of these (not shown) adapted to execute instructions. Base station 1920 further has software 1921 stored internally or accessible via an external connection.

Communication system 1900 further includes UE 1930 already referred to. Its hardware 1935 may include radio interface 1937 configured to set up and maintain wireless connection 1970 with a base station serving a coverage area in which UE 1930 is currently located. Hardware 1935 of UE 1930 further includes processing circuitry 1938, which may comprise one or more programmable processors, application-specific integrated circuits, field programmable gate arrays or combinations of these (not shown) adapted to execute instructions. UE 1930 further comprises software 1931, which is stored in or accessible by UE 1930 and executable by processing circuitry 1938. Software 1931 includes client application 1932. Client application 1932 may be operable to provide a service to a human or non-human user via UE 1930, with the support of host computer 1910. In host computer 1910, an executing host application 1912 may communicate with the executing client application 1932 via OTT connection 1950 terminating at UE 1930 and host computer 1910. In providing the service to the user, client application 1932 may receive request data from host application 1912 and provide user data in response to the request data. OTT connection 1950 may transfer both the request data and the user data. Client application 1932 may interact with the user to generate the user data that it provides.

It is noted that host computer 1910, base station 1920 and UE 1930 illustrated in FIG. 19 may be similar or identical to host computer 1830, one of base stations 1812*a*, 1812*b*, 1812*c* and one of UEs 1891, 1892 of FIG. 18, respectively. This is to say, the inner workings of these entities may be as shown in FIG. 19 and independently, the surrounding network topology may be that of FIG. 18.

In FIG. 19, OTT connection 1950 has been drawn abstractly to illustrate the communication between host computer 1910 and UE 1930 via base station 1920, without explicit reference to any intermediary devices and the precise routing of messages via these devices. Network infrastructure may determine the routing, which it may be configured to hide from UE 1930 or from the service provider operating host computer 1910, or both. While OTT connection 1950 is active, the network infrastructure may further take decisions by which it dynamically changes the routing (e.g., on the basis of load balancing consideration or reconfiguration of the network).

Wireless connection 1970 between UE 1930 and base station 1920 is in accordance with the teachings of the embodiments described throughout this disclosure. One or more of the various embodiments improve the performance of OTT services provided to UE 1930 using OTT connection 1950, in which wireless connection 1970 forms the last segment.

A measurement procedure may be provided for the purpose of monitoring data rate, latency and other factors on which the one or more embodiments improve. There may further be an optional network functionality for reconfiguring OTT connection 1950 between host computer 1910 and UE 1930, in response to variations in the measurement results. The measurement procedure and/or the network functionality for reconfiguring OTT connection 1950 may be implemented in software 1911 and hardware 1915 of host computer 1910 or in software 1931 and hardware 1935 of UE 1930, or both. In embodiments, sensors (not shown) may be deployed in or in association with communication devices through which OTT connection 1950 passes; the sensors may participate in the measurement procedure by supplying values of the monitored quantities exemplified above, or supplying values of other physical quantities from which software 1911, 1931 may compute or estimate the monitored quantities. The reconfiguring of OTT connection 1950 may include message format, retransmission settings, preferred routing etc.; the reconfiguring need not affect base station 1920, and it may be unknown or imperceptible to base station 1920. Such procedures and functionalities may be known and practiced in the art. In certain embodiments, measurements may involve proprietary UE signaling facilitating host computer 1910's measurements of throughput, propagation times, latency and the like. The measurements may be implemented in that software 1911 and 1931 causes messages to be transmitted, in particular empty or 'dummy' messages, using OTT connection 1950 while it monitors propagation times, errors etc.

Figure 20:
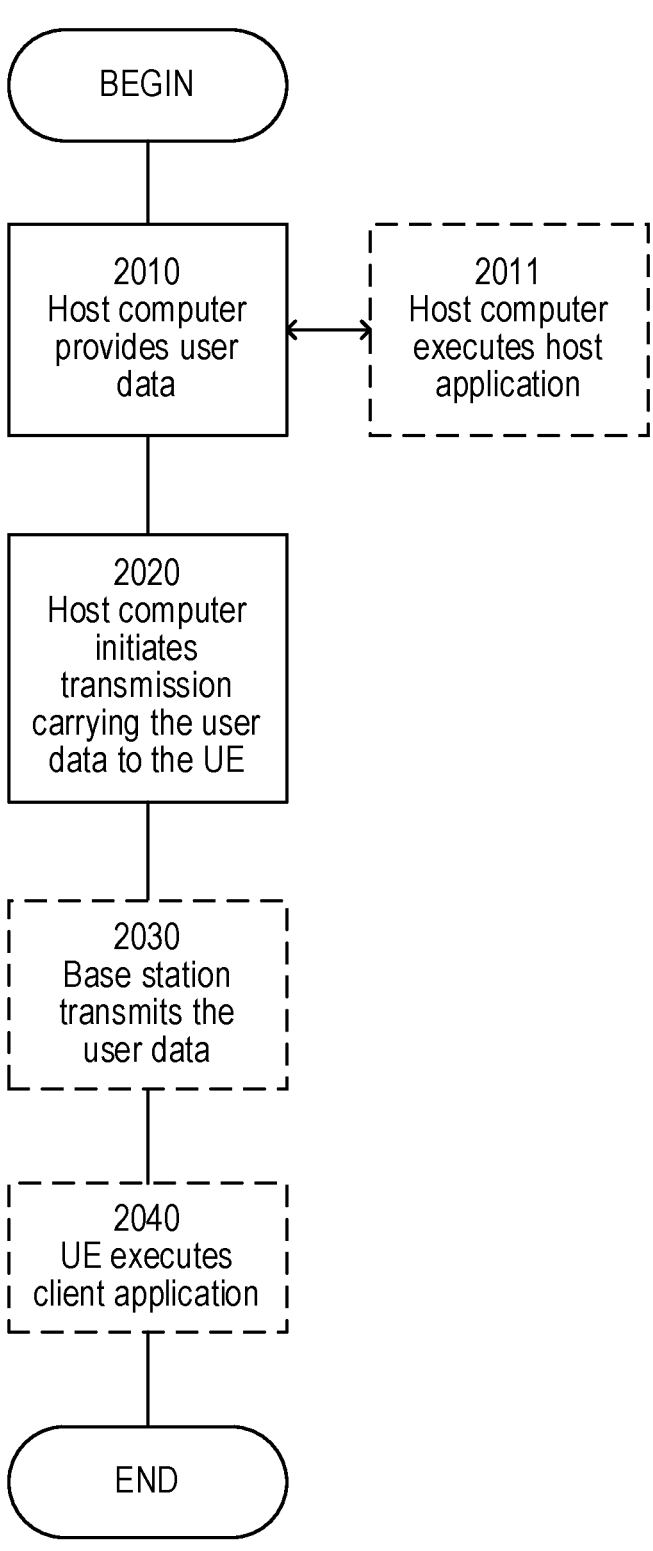
FIG. 20 illustrates methods implemented in a communication system including a host computer, a base station and a user equipment in accordance with some embodiments.

FIG. 20 illustrates methods implemented in a communication system including a host computer, a base station and a user equipment in accordance with some embodiments.

FIG. 20 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 20 will be included in this section. In step 2010, the host computer provides user data. In substep 2011 (which may be optional)

of step 2010, the host computer provides the user data by executing a host application. In step 2020, the host computer initiates a transmission carrying the user data to the UE. In step 2030 (which may be optional), the base station transmits to the UE the user data which was carried in the transmission that the host computer initiated, in accordance with the teachings of the embodiments described throughout this disclosure. In step 2040 (which may also be optional), the UE executes a client application associated with the host application executed by the host computer.

Figure 21:
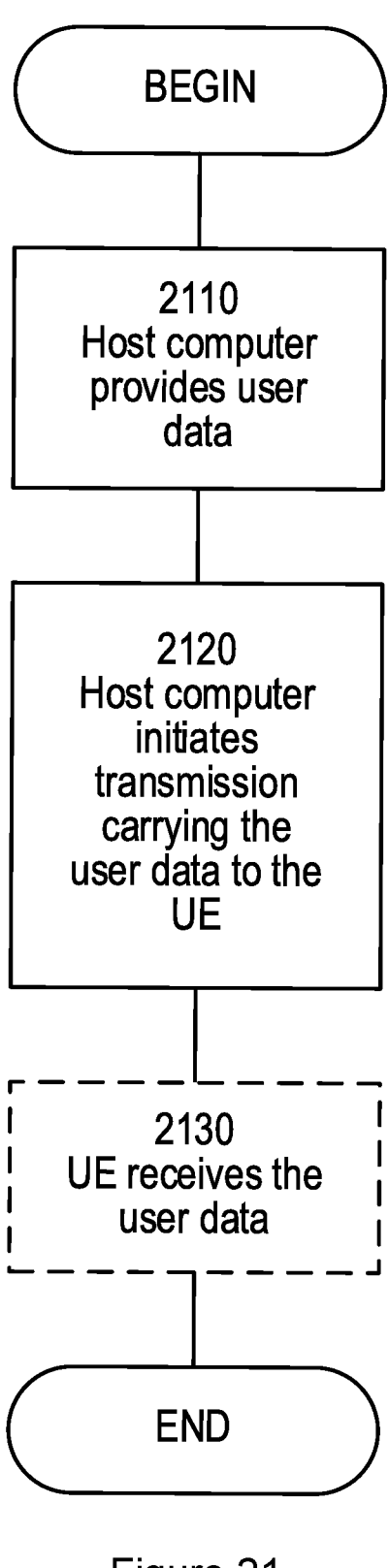
FIG. 21 illustrates methods implemented in a communication system including a host computer, a base station and a user equipment in accordance with some embodiments.

FIG. 21 illustrates methods implemented in a communication system including a host computer, a base station and a user equipment in accordance with some embodiments.

FIG. 21 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 21 will be included in this section. In step 2110 of the method, the host computer provides user data. In an optional substep (not shown) the host computer provides the user data by executing a host application. In step 2120, the host computer initiates a transmission carrying the user data to the UE. The transmission may pass via the base station, in accordance with the teachings of the embodiments described throughout this disclosure. In step 2130 (which may be optional), the UE receives the user data carried in the transmission.

Figure 22:
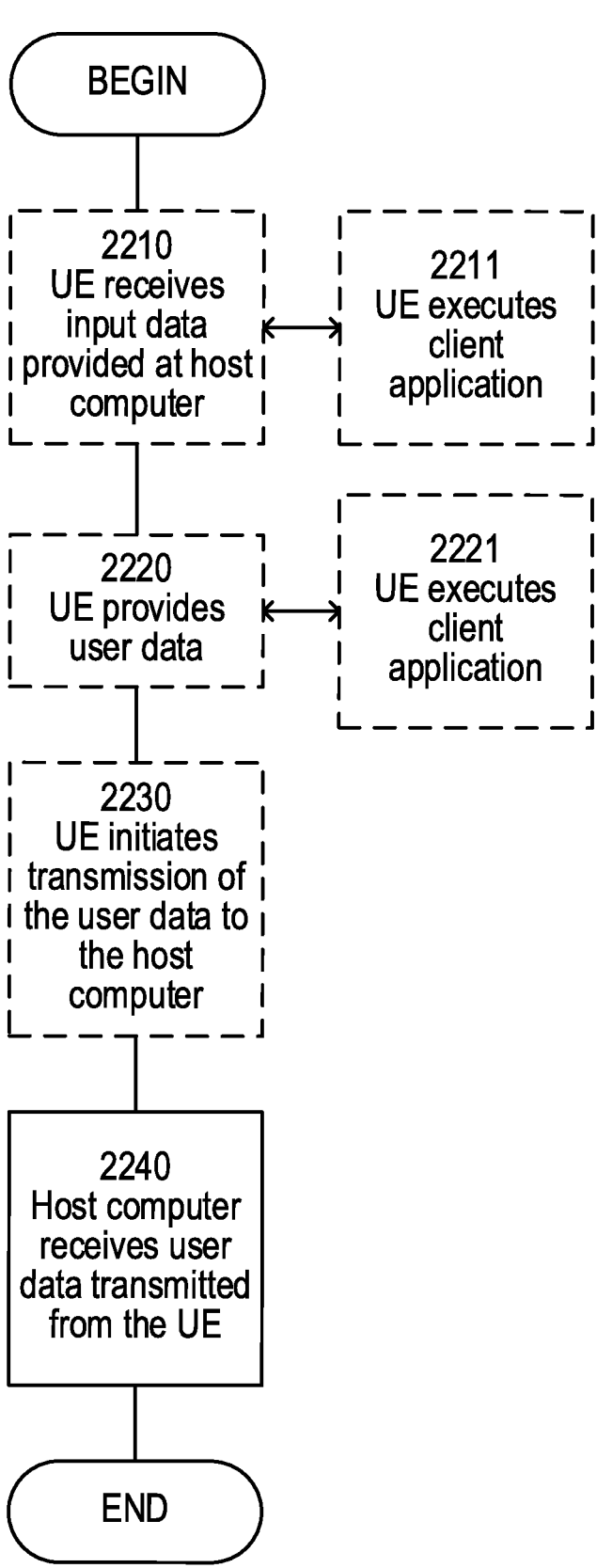
FIG. 22 illustrates methods implemented in a communication system including a host computer, a base station and a user equipment in accordance with some embodiments.

FIG. 22 illustrates methods implemented in a communication system including a host computer, a base station and a user equipment in accordance with some embodiments.

FIG. 22 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 22 will be included in this section. In step 2210 (which may be optional), the UE receives input data provided by the host computer. Additionally or alternatively, in step 2220, the UE provides user data. In substep 2221 (which may be optional) of step 2220, the UE provides the user data by executing a client application. In substep 2211 (which may be optional) of step 2210, the UE executes a client application which provides the user data in reaction to the received input data provided by the host computer. In providing the user data, the executed client application may further consider user input received from the user. Regardless of the specific manner in which the user data was provided, the UE initiates, in substep 2230 (which may be optional), transmission of the user data to the host computer. In step 2240 of the method, the host computer receives the user data transmitted from the UE, in accordance with the teachings of the embodiments described throughout this disclosure.

Figure 23:
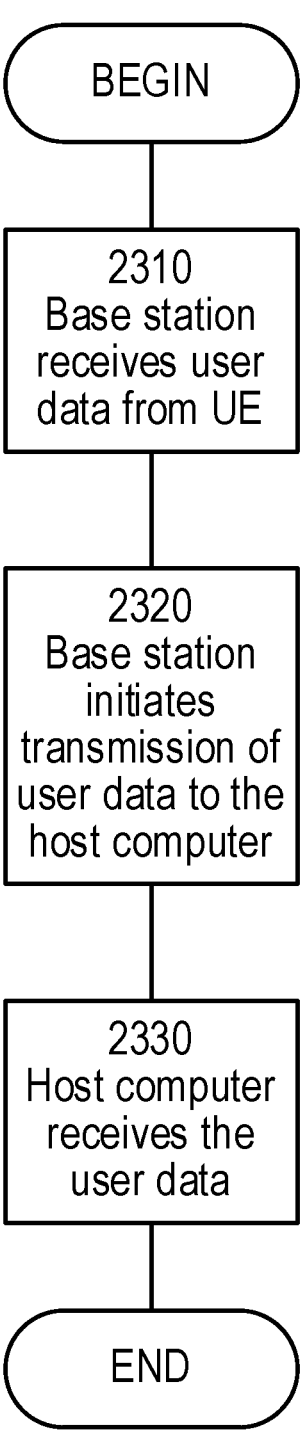
FIG. 23 illustrates methods implemented in a communication system including a host computer, a base station and a user equipment in accordance with some embodiments.

FIG. 23 illustrates methods implemented in a communication system including a host computer, a base station and a user equipment in accordance with some embodiments.

FIG. 23 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 23 will be included in this section. In step 2310 (which may be optional), in accordance with the teachings of the embodiments described throughout this disclosure, the base station receives user data from the UE. In step 2320 (which may be optional), the base station initiates transmission of the received user data to the host computer. In step 2330 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 24:
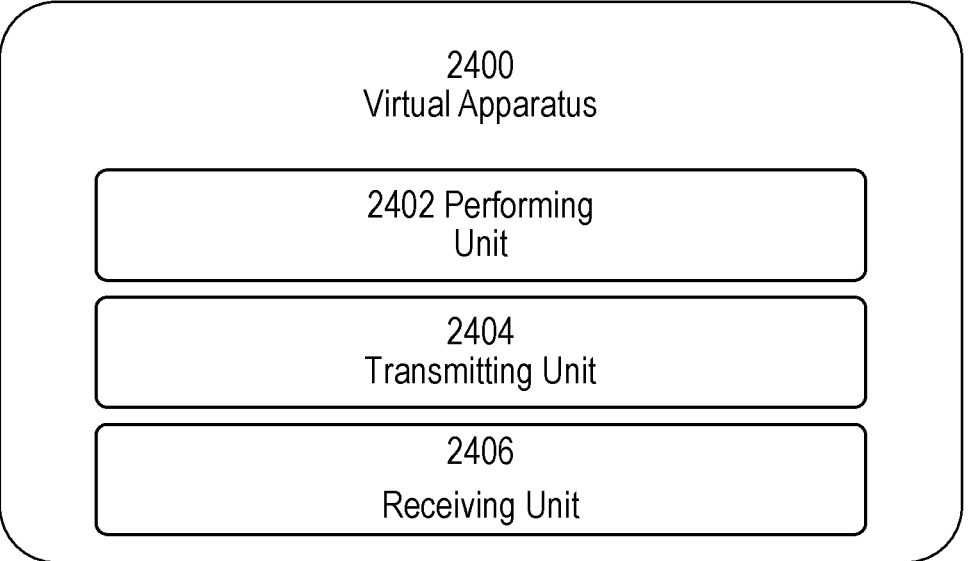
FIG. 24 illustrates a virtualization apparatus in accordance with some embodiments.

FIG. 24 illustrates a virtualization apparatus in accordance with some embodiments.

FIG. 24 illustrates a schematic block diagram of an apparatus 2400 in a wireless network (for example, the wireless network shown in FIG. 15). The apparatus may be implemented in a wireless device (e.g., wireless device 1510). Apparatus 2400 is operable to carry out the example method described with reference to FIG. 9 and possibly any other processes or methods disclosed herein. It is also to be understood that the method of FIG. 9 is not necessarily carried out solely by apparatus 2400. At least some operations of the method can be performed by one or more other entities.

Virtual Apparatus 2400 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause performing unit 2402, transmitting unit 2404, and receiving unit 2406, and any other suitable units of apparatus 2400 to perform corresponding functions according one or more embodiments of the present disclosure.

As illustrated in FIG. 24, apparatus 2400 includes performing unit 2402, transmitting unit 2404, and receiving unit 2406. Performing unit 2402 is configured to Responsive to an application session starting, perform one or more Quality of Experience, QoE, measurements associated with the application. Transmitting unit 2404 is configured to transmit first session feedback indication based on the QoE measurements to a base station, wherein the first session feedback indication indicates that the application session has started.

Receiving Unit 2406 is configured to responsive to transmitting the first session feedback indication, receive a command from the base station to perform one or more radio measurements.

Figure 25:
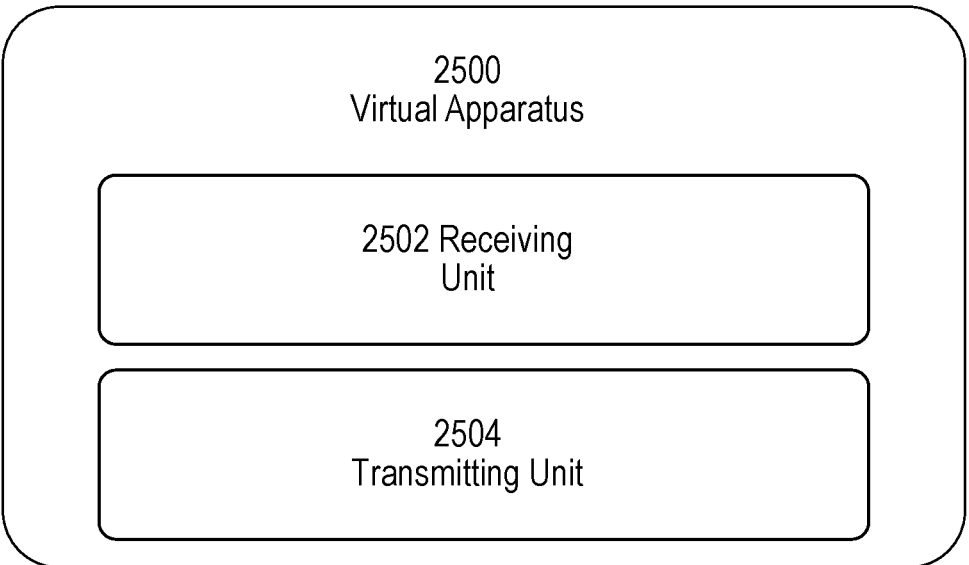
FIG. 25 illustrates a virtualization apparatus in accordance with some embodiments.

FIG. 25 illustrates a virtualization apparatus in accordance with some embodiments.

FIG. 25 illustrates a schematic block diagram of an apparatus 2500 in a wireless network (for example, the wireless network shown in FIG. 15). The apparatus may be implemented in a wireless device (e.g., wireless device 1510). Apparatus 2500 is operable to carry out the example method described with reference to FIG. 10 and possibly any other processes or methods disclosed herein. It is also to be understood that the method of FIG. 10 is not necessarily carried out solely by apparatus 2500. At least some operations of the method can be performed by one or more other entities.

Virtual Apparatus 2500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 2502, and transmitting unit 2504, and any other suitable units of apparatus 2500 to perform corresponding functions according one or more embodiments of the present disclosure.

As illustrated in FIG. 25, apparatus 2500 includes receiving unit 2502, and transmitting unit 2504. Receiving unit 2502 is configured to receive first session feedback indication based on QoE measurements from a wireless device, wherein the first session feedback indication indicates that an application session has started. Transmitting Unit 2504 is configured to responsive to receiving the first session feedback indication, transmit a command to the wireless device to perform one or more radio measurements.

Figure 26:
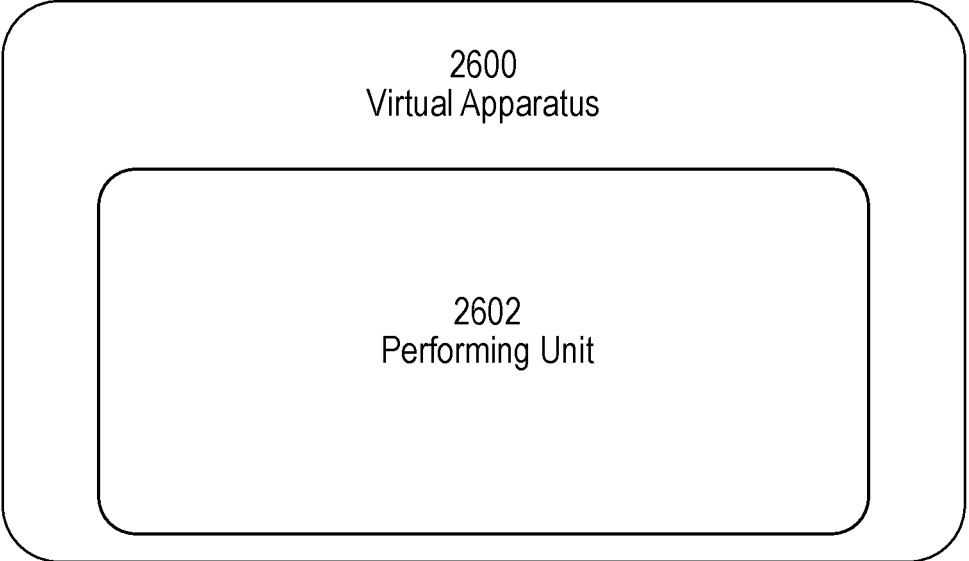
FIG. 26 illustrates a virtualization apparatus in accordance with some embodiments.

FIG. 26 illustrates a virtualization apparatus in accordance with some embodiments.

FIG. 26 illustrates a schematic block diagram of an apparatus 2600 in a wireless network (for example, the wireless network shown in FIG. 15). The apparatus may be implemented in a wireless device (e.g., wireless device 1510). Apparatus 2600 is operable to carry out the example method described with reference to FIG. 12 and possibly any other processes or methods disclosed herein. It is also to be understood that the method of FIG. 12 is not necessarily carried out solely by apparatus 2600. At least some operations of the method can be performed by one or more other entities.

Virtual Apparatus 2600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause performing unit 2602, and any other suitable units of apparatus 2600 to perform corresponding functions according one or more embodiments of the present disclosure.

As illustrated in FIG. 26, apparatus 2600 includes performing unit 2602. Performing unit 2602 is configured to responsive to an application session starting, performing one or more Quality of Experience, QoE, measurements associated with the application and performing one or more radio measurements.

Figure 27:
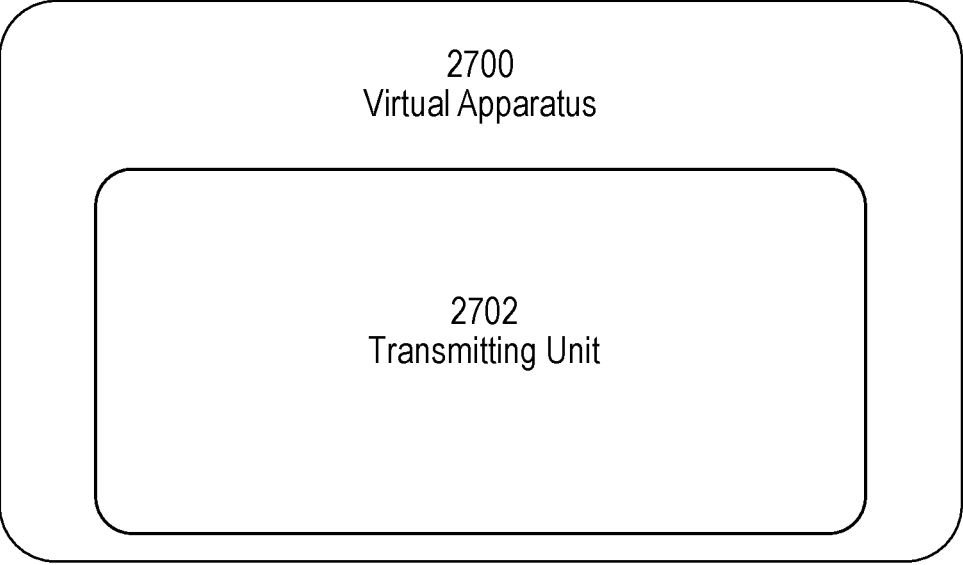
FIG. 27 illustrates a virtualization apparatus in accordance with some embodiments.

FIG. 27 illustrates a virtualization apparatus in accordance with some embodiments.

FIG. 27 illustrates a schematic block diagram of an apparatus 2700 in a wireless network (for example, the wireless network shown in FIG. 15). The apparatus may be implemented in a wireless device (e.g., wireless device 1510). Apparatus 2700 is operable to carry out the example method described with reference to FIG. 13 and possibly any other processes or methods disclosed herein. It is also to be understood that the method of FIG. 13 is not necessarily carried out solely by apparatus 2700. At least some operations of the method can be performed by one or more other entities.

Virtual Apparatus 2700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause transmitting unit 2702 and any other suitable units of apparatus 2700 to perform corresponding functions according one or more embodiments of the present disclosure.

As illustrated in FIG. 27, apparatus 2700 includes transmitting unit 2702. Transmitting unit 2702 is configured to transmit a radio measurement configuration to a wireless device, wherein the radio measurement configuration is indicated as being for use when an application session of an indicated service type starts.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EMBODIMENTS

Group A Embodiments

1. A method performed by a wireless device for performing measurements, the method comprising:

responsive to an application session starting, performing one or more Quality of Experience, QoE, measurements associated with the application;

transmitting a first session feedback indication based on the QoE measurements to a base station, wherein the first session feedback indication indicates that the application session has started; and responsive to transmitting the first session feedback indication, receiving a command from the base station to perform one or more radio measurements.

2. The method of embodiment 1 wherein the first session feedback indication is first transmitted by the application layer in the wireless device to the radio resource control, RRC, layer in the wireless device, and transmitted by the RRC layer to the base station.

3. The method of embodiment 1 or 2 wherein the first session feedback indication comprises an indication of a service type of the application.

4. The method of any of embodiment 1 to 3 wherein the one or more radio measurements comprises one of: an MDT measurement or a layer 2 measurement or a radio resource management, RRM, measurement.

5. The method of any of embodiments 1 to 4 further comprising:

transmitting results of the one or more radio measurements to the base station.

6. The method of any of embodiments 1 to 5 further comprising: responsive to the one or more QoE measurements stopping or pausing, transmitting a second session feedback indication to the base station indicating that the QoE measurements have stopped or paused.

7. The method of embodiment 6 further comprising: responsive to transmitting the second session feedback indication to the network node, receiving a command to terminate or pause the one or more radio measurements from the base station.

8. The method of any of embodiments 1 to 5 further comprising: responsive to the application session stopping or pausing, terminating or pausing the one or more radio measurements.

9. The method of any of embodiments 6 to 8 wherein the one or more QoE measurements stop in response to the application session terminating.

10. The method of any one of embodiments 1 to 9 wherein the command to perform one or more radio measurements comprises an indication of the one or more radio measurements.

11. The method of any one of embodiments 1 to 9 wherein the wireless device is pre-configured with a measurement configuration indicating the one or more radio measurements.

12. A method performed by a wireless device for performing measurements, the method comprising:

responsive to an application session starting, performing one or more Quality of Experience, QoE, measurements associated with the application and performing one or more radio measurements.

13. The method of embodiment 12 further comprising: performing the one or more radio measurements responsive to receiving an indication at a radio resource control layer from an application layer that the application session has started.

14. The method of embodiment 12 further comprising: receiving a radio measurement configuration from a base station, wherein the radio measurement configuration is indicated as being for use when an application session of an indicated service type starts.

15. The method of any of embodiments 12 to 14 further comprising: transmitting session feedback indication to a base station comprising results from the one or more QoE measurements and the one or more radio measurements.

16. The method of any of embodiments 12 to 15 further comprising:
   a. responsive to stopping or pausing the one or more QoE measurements, stopping or pausing the one or more radio measurements.

17. The method of any of the previous embodiments, further comprising:
   providing user data; and
   forwarding the user data to a host computer via the transmission to the base station.

Group B Embodiments

18. A method performed by a base station for performing measurements, the method comprising:
   receiving first session feedback indication based on QoE measurements from a wireless device, wherein the first session feedback indication indicates that an application session has started; and
   responsive to receiving the session feedback indication, transmitting a command to the wireless device to perform one or more radio measurements.

19. The method of embodiment 18 wherein the first session feedback indication comprises an indication of a service type of the application.

20. The method of embodiment 18 or 19 wherein the one or more radio measurements comprises one of: an MDT measurement or a layer 2 measurement or a radio resource management, RRM, measurement.

21. The method of any of embodiments 18 to 20 further comprising:
   receiving results of the one or more radio measurements from the wireless device.

22. The method of any of embodiments 18 to 21 further comprising: receiving a second session feedback indication from the wireless device indicating that the QoE measurements have stopped or paused.

23. The method of embodiment 22 further comprising: responsive to receiving the second session feedback indication to the network node, transmitting, to the wireless device, a command to terminate or pause the one or more radio measurements.

24. The method of embodiment 22 or 23 wherein the one or more QoE measurements stop in response to the application session terminating.

25. The method of any one of embodiments 18 to 24 wherein the command to perform one or more radio measurements comprises an indication of the one or more radio measurements.

26. The method of any one of embodiments 18 to 25 further comprising pre-configuring the wireless device with a measurement configuration indicating the one or more radio measurements.

27. A method performed by a base station for performing measurements, the method comprising:
   transmitting a radio measurement configuration to a wireless device, wherein the radio measurement configuration is indicated as being for use when an application session of an indicated service type starts, or an application session associated with a session identification starts, or when Quality of Experience, QoE, measurements start associated with a QoE reference identification.

28. The method of any of the previous embodiments, further comprising:
   obtaining user data; and
   forwarding the user data to a host computer or a wireless device.

Group C Embodiments

29. A wireless device for performing measurements, the wireless device comprising:
   processing circuitry configured to perform any of the steps of any of the Group A embodiments; and
   power supply circuitry configured to supply power to the wireless device.

30. A base station for receiving measurements, the base station comprising:
   processing circuitry configured to perform any of the steps of any of the Group B embodiments;
   power supply circuitry configured to supply power to the base station.

31. A user equipment (UE) for performing measurements, the UE comprising:
   an antenna configured to send and receive wireless signals;
   radio front-end circuitry connected to the antenna and to processing circuitry, and configured to condition signals communicated between the antenna and the processing circuitry;
   the processing circuitry being configured to perform any of the steps of any of the Group A embodiments;
   an input interface connected to the processing circuitry and configured to allow input of information into the UE to be processed by the processing circuitry;
   an output interface connected to the processing circuitry and configured to output information from the UE that has been processed by the processing circuitry; and
   a battery connected to the processing circuitry and configured to supply power to the UE.

32. A communication system including a host computer comprising:
   processing circuitry configured to provide user data; and
   a communication interface configured to forward the user data to a cellular network for transmission to a user equipment (UE),
   wherein the cellular network comprises a base station having a radio interface and processing circuitry, the base station's processing circuitry configured to perform any of the steps of any of the Group B embodiments.

33. The communication system of the previous embodiment further including the base station.

34. The communication system of any of the previous 2 embodiments, further including the UE, wherein the UE is configured to communicate with the base station.

35. The communication system of any of the previous 3 embodiments, wherein:
   the processing circuitry of the host computer is configured to execute a host application, thereby providing the user data; and
   the UE comprises processing circuitry configured to execute a client application associated with the host application.

36. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group B embodiments.

37. The method of the previous embodiment, further comprising, at the base station, transmitting the user data.

38. The method of any of the previous 2 embodiments, wherein the user data is provided at the host computer by executing a host application, the method further comprising, at the UE, executing a client application associated with the host application.

39. A user equipment (UE) configured to communicate with a base station, the UE comprising a radio interface and processing circuitry configured to performs the of the previous 3 embodiments.

40. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

41. The communication system of the previous embodiment, wherein the cellular network further includes a base station configured to communicate with the UE.

42. The communication system of any of the previous 2 embodiments, wherein:

the processing circuitry of the host computer is configured to execute a host application, thereby providing the user data; and the UE's processing circuitry is configured to execute a client application associated with the host application.

43. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A embodiments.

44. The method of the previous embodiment, further comprising at the UE, receiving the user data from the base station.

45. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A embodiments.

46. The communication system of the previous embodiment, further including the UE.

47. The communication system of any of the previous 2 embodiments, further including the base station, wherein the base station comprises a radio interface configured to communicate with the UE and a communication interface configured to forward to the host computer the user data carried by a transmission from the UE to the base station.

48. The communication system of any of the previous 3 embodiments, wherein:

the processing circuitry of the host computer is configured to execute a host application; and the UE's processing circuitry is configured to execute a client application associated with the host application, thereby providing the user data.

49. The communication system of any of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

50. A method implemented in a communication system including a host computer, a base station and a user equipment (UE), the method comprising:

at the host computer, receiving user data transmitted to the base station from the UE, wherein the UE performs any of the steps of any of the Group A embodiments.

51. The method of the previous embodiment, further comprising, at the UE, providing the user data to the base station.

52. The method of any of the previous 2 embodiments, further comprising:

at the UE, executing a client application, thereby providing the user data to be transmitted; and at the host computer, executing a host application associated with the client application.

53. The method of any of the previous 3 embodiments, further comprising:

at the UE, executing a client application; and at the UE, receiving input data to the client application, the input data being provided at the host computer by executing a host application associated with the client application, wherein the user data to be transmitted is provided by the client application in response to the input data.

54. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

55. The communication system of the previous embodiment further including the base station.

56. The communication system of the previous 2 embodiments, further including the UE, wherein the UE is configured to communicate with the base station.

57. The communication system of the previous 3 embodiments, wherein:

the processing circuitry of the host computer is configured to execute a host application;

the UE is configured to execute a client application associated with the host application, thereby providing the user data to be received by the host computer.

58. A method implemented in a communication system including a host computer, a base station and a user equipment (UE), the method comprising:

at the host computer, receiving, from the base station, user data originating from a transmission which the base station has received from the UE, wherein the UE performs any of the steps of any of the Group A embodiments.

59. The method of the previous embodiment, further comprising at the base station, receiving the user data from the UE.

60. The method of the previous 2 embodiments, further comprising at the base station, initiating a transmission of the received user data to the host computer.

The invention claimed is:

1. A method performed by a wireless device configured to perform measurements, the method comprising:

responsive to an application session starting, performing one or more quality of experience (QoE) measurements associated with the application;

transmitting to a base station a first session feedback indication based on the QoE measurements, wherein the first session feedback indication indicates that the application session has started; and responsive to transmitting the first session feedback indication, receiving a command from the base station to perform one or more radio measurements.

2. The method of claim 1 wherein the first session feedback indication is transmitted by an application layer in the wireless device to a radio resource control (RRC) layer in the wireless device, and then transmitted to the base station by the RRC layer.

3. The method of 1 wherein the first session feedback indication comprises an indication of a service type of the application.

4. The method of claim 1 wherein the one or more radio measurements include one or more of the following: one or more MDT measurements, one or more layer-2 measurements, and one or more radio resource management (RRM) measurement.

5. The method of claim 1 further comprising transmitting to the base station results of the one or more radio measurements.

6. The method of claim 1 further comprising:

stopping or pausing the one or more QoE measurements; and responsive to stopping or pausing the one or more QoE measurements, transmitting to the base station a second session feedback indication indicating that the QoE measurements have stopped or paused.

7. The method of claim 6 further comprising, responsive to transmitting the second session feedback indication to the base station, receiving from the base station a command to terminate or pause the one or more radio measurements.

8. The method of claim 6 wherein the one or more QoE measurements are stopped in response to the application session terminating.

9. The method of claim 1 further comprising, responsive to the application session stopping or pausing, terminating or pausing the one or more radio measurements.

10. The method of claim 1 wherein the command to perform one or more radio measurements comprises an indication of the one or more radio measurements to be performed.

11. The method of claim 1 wherein the wireless device is pre-configured with a measurement configuration indicating the one or more radio measurements.

12. A method performed by a base station configured to perform measurements, the method comprising:

receiving from a wireless device first session feedback indication based on wireless device quality of experience (QoE) measurements associated with an application, wherein the first session feedback indication indicates that an application session has started; and responsive to receiving the session feedback indication, transmitting to the wireless device a command to perform one or more radio measurements.

13. The method of claim 12 wherein the first session feedback indication comprises an indication of a service type of the application.

14. The method of claim 12, wherein the one or more radio measurements include one or more of the following: one or more MDT measurements, one or more layer-2 measurements, and one or more radio resource management (RRM) measurement.

15. The method of claim 12 further comprising receiving from the wireless device results of the one or more radio measurements.

16. The method of claim 12 further comprising receiving from the wireless device a second session feedback indication indicating that the QoE measurements have stopped or paused.

17. The method of claim 16 further comprising, responsive to the second session feedback indication, transmitting to the wireless device a command to terminate or pause the one or more radio measurements.

18. The method of claim 16 wherein the one or more QoE measurements have stopped in response to the application session terminating.

19. The method of claim 16 wherein the command to perform one or more radio measurements comprises an indication of the one or more radio measurements to be performed.

20. The method of claim 12 further comprising pre-configuring the wireless device with a measurement configuration indicating the one or more radio measurements.

21. A wireless device configured to perform measurements, the wireless device comprising:

processing circuitry; and a memory containing instructions executable by the processing circuitry, whereby the wireless device is operative to:

responsive to an application session starting, perform one or more Quality of Experience, QoE, measurements associated with the application;

transmit a first session feedback indication based on the QoE measurements to a base station, wherein the first session feedback indication indicates that the application session has started; and responsive to transmitting the first session feedback indication, receive a command from the base station to perform one or more radio measurements.

22. A base station configured to perform measurements, the base station comprising:

processing circuitry; and a memory containing instructions executable by the processing circuitry, whereby the base station is operative to:

receive first session feedback indication based on QoE measurements from a wireless device, wherein the first session feedback indication indicates that an application session has started; and responsive to receiving the session feedback indication, transmit a command to the wireless device to perform one or more radio measurements.

* * * * *